(12) United States Patent
Yamamoto et al.

(10) Patent No.: US 7,291,368 B2
(45) Date of Patent: Nov. 6, 2007

(54) LIQUID CRYSTAL COMPOSITION AND LIQUID CRYSTAL DISPLAY DEVICE

(75) Inventors: Hitoshi Yamamoto, Chiba (JP); Yasuyuki Sasada, Chiba (JP); Hiroaki Fujita, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 86 days.

(21) Appl. No.: 11/101,567

(22) Filed: Apr. 8, 2005

(65) Prior Publication Data

US 2005/0224758 A1    Oct. 13, 2005

(30) Foreign Application Priority Data

Apr. 9, 2004    (JP)    ............... 2004-115933

(51) Int. Cl.
   *C09K 19/30*    (2006.01)
   *C09K 19/12*    (2006.01)
   *C09K 19/52*    (2006.01)

(52) U.S. Cl. ............. 428/1.1; 252/299.01; 252/299.63; 252/299.66

(58) Field of Classification Search ........... 252/299.01, 252/299.63, 299.66; 428/1.1
   See application file for complete search history.

(56) References Cited

U.S. PATENT DOCUMENTS

| | | | |
|---|---|---|---|
| 5,384,065 | A | 1/1995 | Geelhaar et al. |
| 6,248,410 | B1 | 6/2001 | Ichinose et al. |
| 6,544,604 | B2 | 4/2003 | Matsui et al. |
| 2002/0119260 | A1 | 8/2002 | Matsui et al. |

FOREIGN PATENT DOCUMENTS

| | | |
|---|---|---|
| EP | 0 893 423 | 1/1999 |
| JP | 2004-35698 | 2/2004 |

*Primary Examiner*—Shean C. Wu
(74) *Attorney, Agent, or Firm*—Wenderoth, Lind & Ponack, L.L.P.

(57) ABSTRACT

The present invention is to provide such a liquid crystal composition that satisfies plural characteristic features selected from a wide temperature range of a nematic phase, a low viscosity, an appropriate optical anisotropy, a large negative dielectric anisotropy and a large specific resistance.

The liquid crystal composition of the invention contains, as a first component, at least one compound selected from the group consisting of compounds represented by Formula (1-1) to (1-4); contains, as a second component, at least one compound selected from the group consisting of compounds represented by Formula (2-1) to (2-3); and has a negative dielectric anisotropy. In the following formulae, all the symbols are defined in claim 1

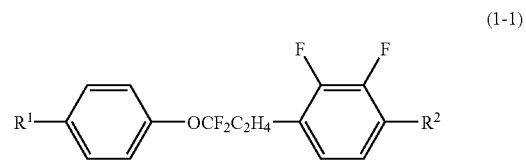

(1-1)

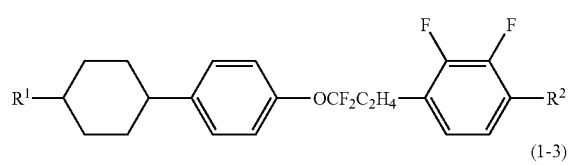

(1-2)

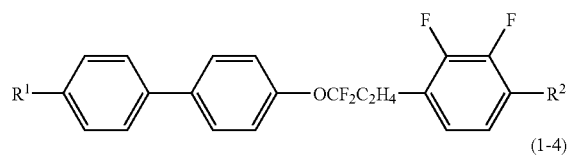

(1-3)

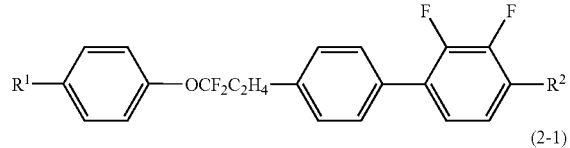

(1-4)

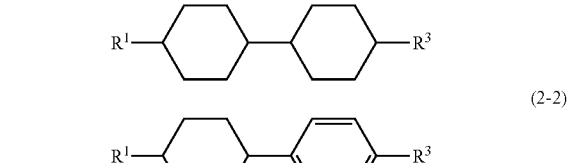

(2-1)

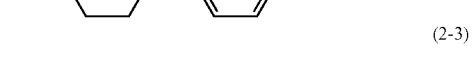

(2-2)

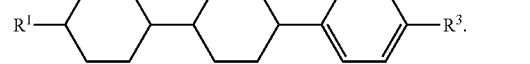

(2-3)

24 Claims, No Drawings

LIQUID CRYSTAL COMPOSITION AND LIQUID CRYSTAL DISPLAY DEVICE

FIELD OF THE INVENTION

The present invention relates to a liquid crystal composition suitable mainly for an AM (active matrix) device, and an AM device containing the composition.

BACKGROUND OF THE INVENTION

Liquid crystal display devices are classified in terms of operation mode of liquid crystal into PC (phase change), TN (twisted nematic), STN (super twisted nematic), OCB (optically compensated bend), IPS (in-plane switching), VA (vertical alignment) and the like. They are also classified in terms of driving system of the devices into PM (passive matrix) and AM (active matrix). The PM is classified into static, multiplex and the like, and the AM is classified into TFT (thin film transistor), MIM (metal insulator metal) and the like. The TFT is classified into amorphous silicon, polycrystalline silicon, and continuous grain silicon (CGS). The polycrystalline silicon is classified in terms of production process into a high temperature type and a low temperature type. Liquid crystal devices are further classified in terms of light source into a reflection type utilizing sun light, a transmission type utilizing a backlight, and a semitransmission type utilizing both of them.

In the following description, a liquid crystal composition is sometimes simply referred to as a composition, a liquid crystal display device is sometimes simply referred to as a device, and a liquid crystalline compound is sometimes simply referred to as a compound. The device contains a liquid crystal composition having suitable characteristics. In order to obtain an AM device having good general characteristics, it is preferred to improve the general characteristics of the composition. The relationships between the general characteristics of the AM device and those of the composition are summarized in Table 1 below. The general characteristics of the composition will be further described based on the commercially available AM device. The temperature range of the nematic phase relates to the temperature range, within which the device can be used. The upper limit temperature of the nematic phase is preferably 70° C., and the lower limit temperature of the nematic phase is preferably −20° C. The viscosity of the composition relates to the response time. The response time is preferably short in the case where a moving image is displayed by the device. Therefore, the composition preferably has a low viscosity. It is more preferred that the viscosity thereof at a low temperature is small.

TABLE 1

General Characteristics in Composition and AM Device

| No. | General characteristics of composition | General characteristics of AM device |
|---|---|---|
| 1 | wide temperature range of nematic phase | wide usable temperature range |
| 2 | low viscosity (1) | short response time |
| 3 | suitable optical anisotropy | large contrast ratio |
| 4 | large positive or negative dielectric anisotropy | low driving voltage and small consumption electric power |

TABLE 1-continued

General Characteristics in Composition and AM Device

| No. | General characteristics of composition | General characteristics of AM device |
|---|---|---|
| 5 | large specific resistance | large voltage holding ratio and large contrast ratio |

(1) The time for charging the composition in a liquid crystal cell can be shortened.

The optical anisotropy of the composition relates to the contrast ratio of the device. A device having a VA mode, an IPS mode and the like utilizes electrically controlled birefringence (ECB). In order to maximize the contrast ratio of a device having a VA mode, an IPS mode and the like, the product ($\Delta n \cdot d$) of the optical anisotropy ($\Delta n$) of the composition and the cell gap (d) is designed to be a certain value. Examples of the value are from 0.30 to 0.35 μm for a VA mode and from 0.20 to 0.30 μm for an IPS mode. The cell gap (d) is generally from 3 to 6 μm, and therefore, the optical anisotropy of the composition is mainly in a range of from 0.050 to 0.110. In the case where the device is designed to have a small cell gap (d), the optical anisotropy ($\Delta n$) of the composition is preferably designed to be a larger value. A large dielectric anisotropy of the composition contributes to a small driving voltage. Therefore, the dielectric anisotropy is preferably large. A large specific resistance of the composition contributes to a large voltage holding ratio and a large contrast ratio of the device. Therefore, a composition having a large specific resistance in the initial stage is preferred. A composition preferably has a large specific resistance even after using for a long period of time.

In an AM device having a TN mode and the like, a composition having a positive dielectric anisotropy is used. In an AM device having a VA mode and the like, on the other hand, a composition having a negative dielectric anisotropy is used. In an AM device using an IPS mode and the like, a composition having a positive or negative dielectric anisotropy is used. The liquid crystal composition having a negative dielectric anisotropy contains a composition having a negative dielectric anisotropy. The compound has a polar group, such as fluorine, in a minor axis direction of the molecule. The composition having a negative dielectric anisotropy is disclosed in the following documents.

(Patent Document 1)
   EP 0,893,423A (Patent Document 2)
   U.S. 2002119260 A1 (patent family: U.S. Pat. No. 6,544,604 B2)

(Patent Document 3)
   JP-A-2004-35698

(Patent Document 4)
   U.S. Pat. No. 6,248,410 B1

(Patent Document 5)
   U.S. Pat. No. 5,384,065

An object of the invention is to provide such a liquid crystal composition that satisfies plural characteristic features selected from a wide temperature range of a nematic phase, a low viscosity, an appropriate optical anisotropy, a large negative dielectric anisotropy and a large specific resistance. It is also an object of the invention to obtain a liquid crystal composition having the plural characteristic features in a well-balanced manner. Another object of the invention is to provide such a liquid crystal display device containing the composition that has a large voltage holding ratio. What is important in the device is to provide such a device that contains a composition having a low viscosity, an optical anisotropy of from 0.050 to 0.130, and a dielectric anisotropy of from −6.5 to −2.0, and is suitable for a VA mode, an IPS mode and the like.

SUMMARY OF THE INVENTION

The invention includes the following constitutions.

(1) A liquid crystal composition containing, as a first component, at least one compound selected from the group consisting of compounds represented by each of Formula (1-1) to Formula (1-4); containing, as a second component, at least one compound selected from the group consisting of compounds represented by each of Formula (2-1) to Formula (2-3); and having a negative dielectric anisotropy:

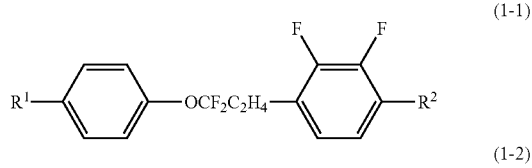
(1-1)

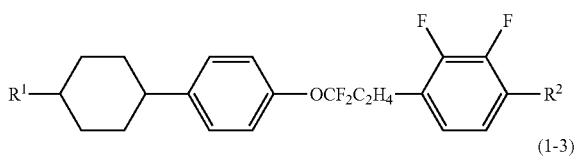
(1-2)

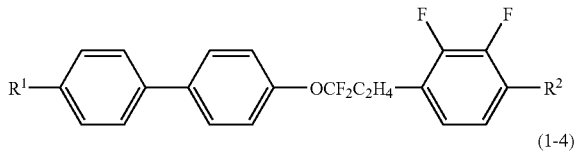
(1-3)

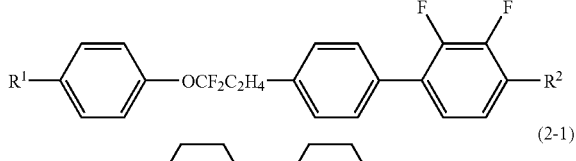
(1-4)

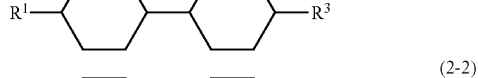
(2-1)

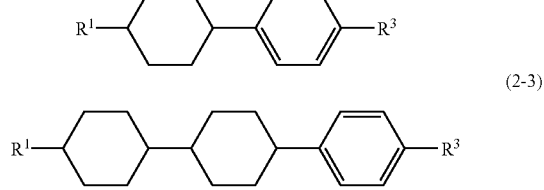
(2-2)

(2-3)

wherein $R^1$ represents an alkyl or an alkenyl; $R^2$ represents an alkoxy; and $R^3$ represents an alkyl, an alkenyl or an alkoxy; and in these groups, each of the alkyl and the alkoxy has a carbon number of from 1 to 10, and the alkenyl has a carbon number of from 2 to 10.

(2) The liquid crystal composition as described in the item (1), wherein the composition contains, as the first component, at least one compound selected from the group consisting of compounds represented by each of Formula (1-2) and Formula (1-4), and contains, as the second component, at least one compound selected from the group consisting of compounds represented by each of Formula (2-1) and Formula (2-2).

(3) The liquid crystal composition as described in the item (1), wherein the composition contains, as the first component, at least one compound selected from the group consisting of compounds represented by Formula (1-1), and contains, as the second component, at least one compound selected from the group consisting of compounds represented by Formula (2-3).

(4) The liquid crystal composition as described in one of the items (1) to (3), wherein a content of the first component is from 10 to 95% by weight, and a content of the second component is from 5 to 90% by weight, based on the total weight of the liquid crystal composition.

(5) A liquid crystal composition containing, as a first component, at least one compound selected from the group consisting of compounds represented by each of Formula (1-1) to Formula (1-4); containing, as a second component, at least one compound selected from the group consisting of compounds represented by each of Formula (2-1) to Formula (2-3); containing, as a third component, at least one compound selected from the group consisting of compounds represented by each of Formula (3-1) to Formula (3-5); and having a negative dielectric anisotropy:

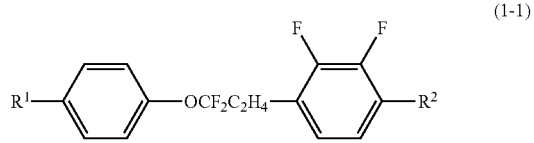
(1-1)

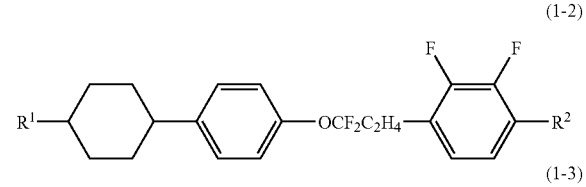
(1-2)

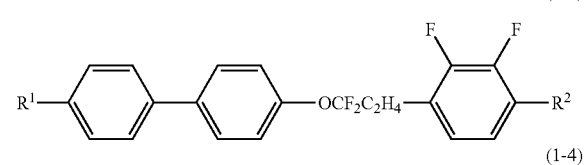
(1-3)

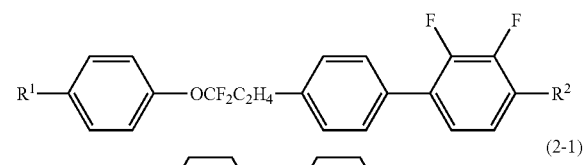
(1-4)

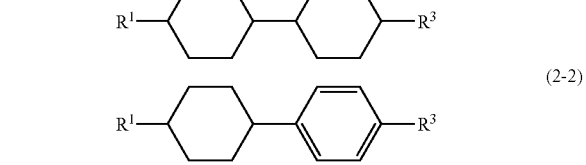
(2-1)

(2-2)

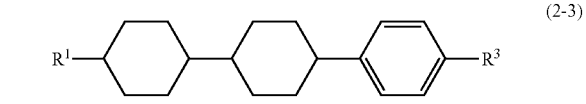
(2-3)

-continued

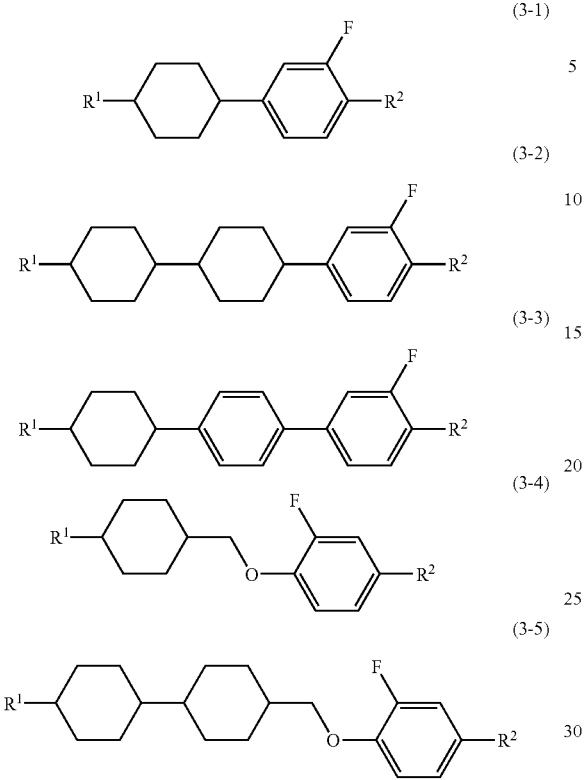

wherein R¹ represents an alkyl or an alkenyl; R² represents an alkoxy; R³ represents an alkyl, an alkenyl or an alkoxy; and in these groups, each of the alkyl and the alkoxy has a carbon number of from 1 to 10, and the alkenyl has a carbon number of from 2 to 10.

(6) The liquid crystal composition as described in the item (5), wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), and contains, as the third component, at least one compound selected from the group consisting of compounds represented by each of Formula (3-1) to Formula (3-3).

(7) The liquid crystal composition as described in the item (5), wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), and contains, as the third component, at least one compound selected from the group consisting of compounds represented by each of Formula (3-4) and Formula (3-5).

(8) The liquid crystal composition as described in one of the items (5) to (7), wherein a content of the first component is from 10 to 90% by weight, a content of the second component is from 5 to 85% by weight, and a content of the third component is from 5 to 85% by weight, based on the total weight of the liquid crystal composition.

(9) The liquid crystal composition as described in one of the items (5) to (7), wherein a content of the first component is from 40 to 90% by weight, a content of the second component is from 5 to 55% by weight, and a content of the third component is from 5 to 55% by weight, based on the total weight of the liquid crystal composition.

(10) A liquid crystal composition containing, as a first component, at least one compound selected from the group consisting of compounds represented by each of Formula (1-1) to Formula (1-4); containing, as a second component, at least one compound selected from the group consisting of compounds represented by each of Formula (2-1) to Formula (2-3); containing, as a third component, at least one compound selected from the group consisting of compounds represented by each of Formula (3-1) to Formula (3-5); containing, as a fourth component, at least one compound selected from the group consisting of compounds represented by each of Formula (4-1) to Formula (4-5); and having a negative dielectric anisotropy:

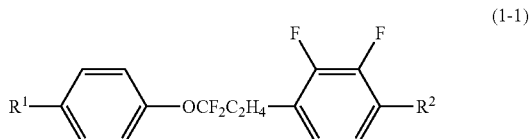

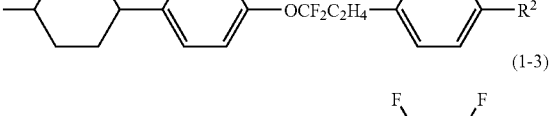

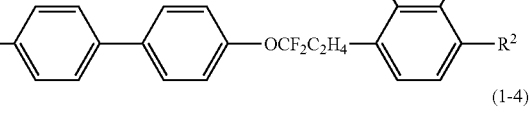

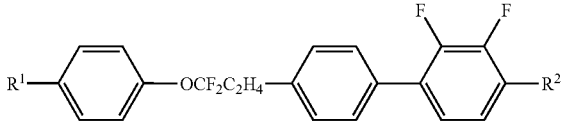

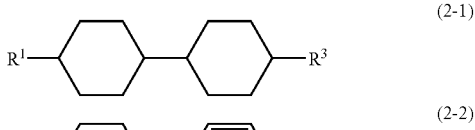

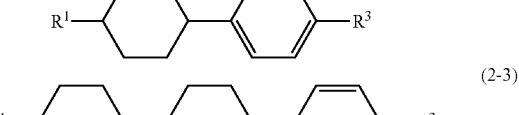

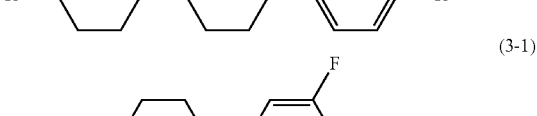

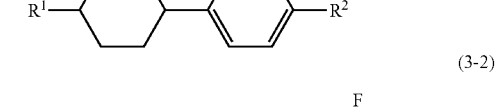

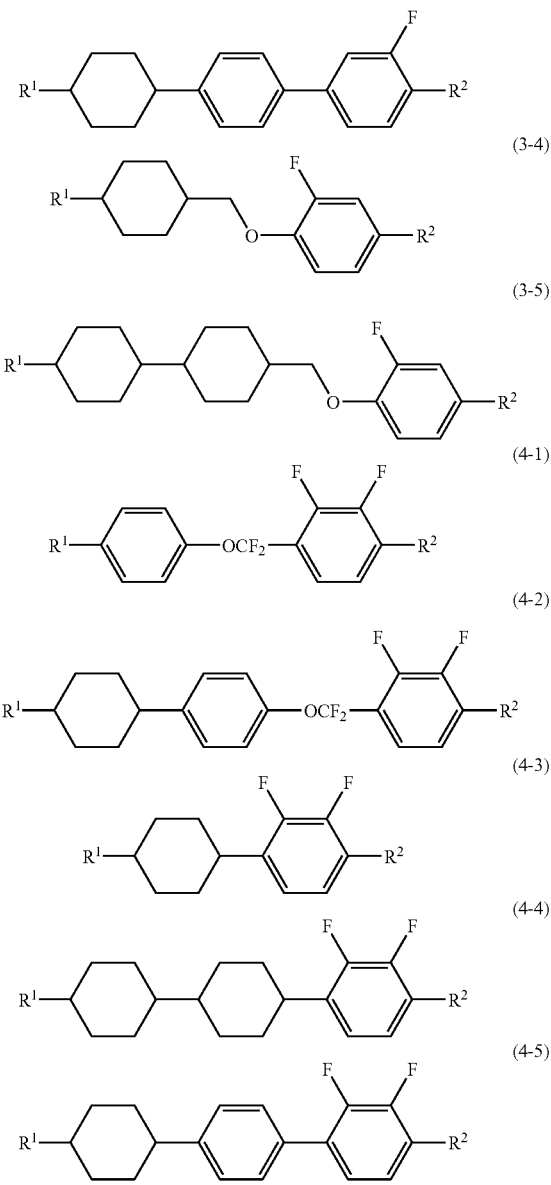

wherein R¹ represents an alkyl or an alkenyl; R² represents an alkoxy; R³ represents an alkyl, an alkenyl or an alkoxy, and in these groups, each of the alkyl and the alkoxy has a carbon number of from 1 to 10, and the alkenyl has a carbon number of from 2 to 10.

(11) The liquid crystal composition as described in the item (10), wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-1) to Formula (4-5).

(12) The liquid crystal composition as described in the item (10), wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-1) and Formula (4-2).

(13) The liquid crystal composition as described in the item (10), wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-3) to Formula (4-5).

(14) The liquid crystal composition as described in the item (10), wherein the composition contains, as the first component, at least one compound selected from the group consisting of compounds represented by Formula (1-1), contains, as the second component, at least one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-4) and Formula (4-5).

(15) The liquid crystal composition as described in the item (10), wherein the composition contains, as the first component, at least one compound selected from the group consisting of compounds represented by Formula (1-1), contains, as the second component, at least one compound selected from the group consisting of compounds represented by Formula (2-3), contains, as the third component, at least one compound selected from the group consisting of compounds represented by each of Formula (3-1) and Formula (3-2), and contains, as the fourth component, at least one compound selected from the group consisting of compounds represented by each of Formula (4-4) and Formula (4-5).

(16) The liquid crystal composition as described in one of the items (10) to (15), wherein a content of the first component is from 10 to 85% by weight, a content of the second component is from 5 to 80% by weight, a content of the third component is from 5 to 80% by weight, and a content of the fourth component is from 5 to 80% by weight, based on the total weight of the liquid crystal composition.

(17) The liquid crystal composition as described in one of the items (10) to (15), wherein a content of the first component is from 20 to 65% by weight, a content of the second component is from 10 to 55% by weight, a content of the third component is from 5 to 50% by weight, and a content of the fourth component is from 20 to 65% by weight, based on the total weight of the liquid crystal composition.

(18) The liquid crystal composition as described in one of the items (1) to (17), wherein the composition has a dielectric anisotropy in a range of from −6.5 to −2.0.

(19) A liquid crystal display device containing the liquid crystal composition as described in one of the items (1) to (18).

(20) The liquid crystal display device as described in the item (19), wherein the device is an active matrix driving device having a VA mode or an IPS mode.

DETAILED DESCRIPTION OF THE INVENTION

Several terms in the specification are used as below. The liquid crystal display device is a generic name for a liquid crystal display panel and a liquid crystal display module. The AM device means a liquid crystal display device driven by an active matrix. The TN device means a liquid crystal display device having a TN mode. The devices having other modes are referred to in the similar manners. The liquid crystal composition contains a liquid crystal compound. The liquid crystal compound is a generic name of compounds having a liquid crystal phase, such as a nematic phase and a smectic phase, and such compounds that have no liquid crystal phase but are suitable as a component of the composition. At least one compound selected from the group consisting of compounds represented by Formula (1-1) is sometimes referred to as Compound (1-1). The compounds represented by the other formulae are also sometimes referred to in the similar manners.

The term "large specific resistance" means that the composition has a large specific resistance in the initial stage and also has a large specific resistance even after using for a long period of time. The term "large voltage holding ratio" means that the composition has a large voltage holding ratio in the initial stage and also has a large voltage holding ratio even after using for a long period of time. Upon describing the characteristics, such as the optical anisotropy, values measured by the methods disclosed in Examples are used. The proportions of the components in the composition are in terms of percentage by weight (% by weight) based on the total weight of the composition.

The constitution of the components in the composition will be firstly described. The composition of the invention contains, as the first component, at least one compound selected from the group consisting of Compound (1-1) to Compound (1-4), and contains, as the second component, at least one compound selected from the group consisting of Compound (2-1) to Compound (2-3). The composition of the invention may further contain, in addition to the first and second components, at least one compound selected from the group consisting of Compound (3-1) to Compound (3-5) as the third component. The composition of the invention may further contain, in addition to the first, second and third components, at least one compound selected from the group consisting of Compound (4-1) to Compound (4-5) as the fourth component.

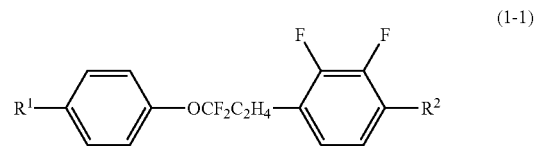

(1-1)

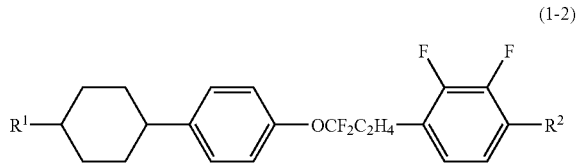

(1-2)

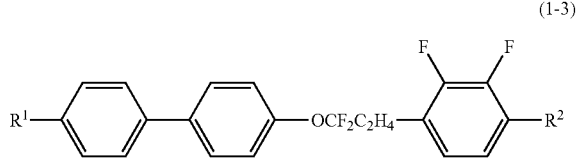

(1-3)

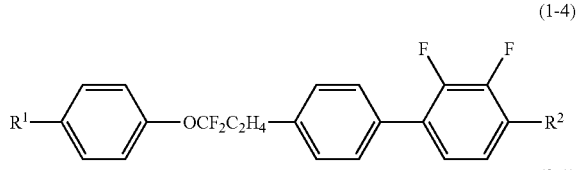

(1-4)

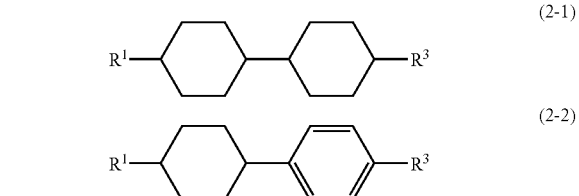

(2-1)

(2-2)

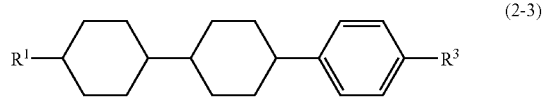

(2-3)

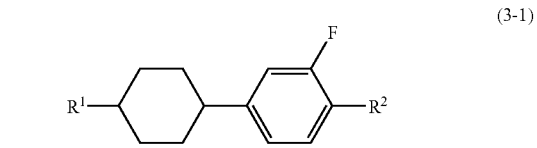

(3-1)

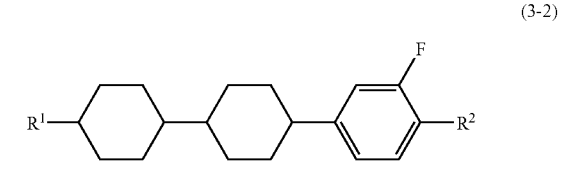

(3-2)

(3-3)

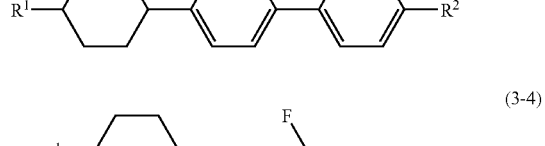

(3-4)

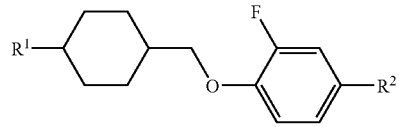

-continued

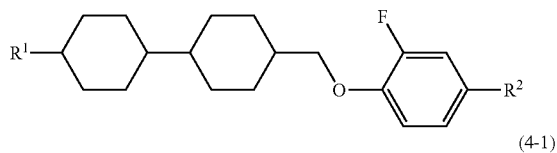

(3-5)

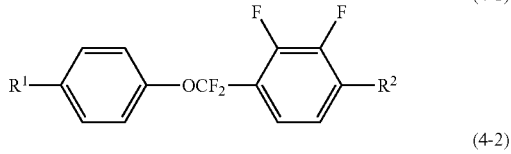

(4-1)

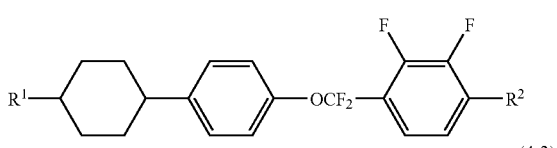

(4-2)

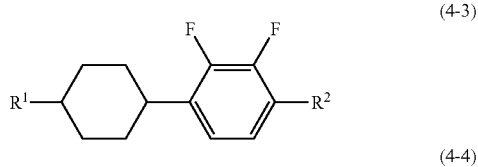

(4-3)

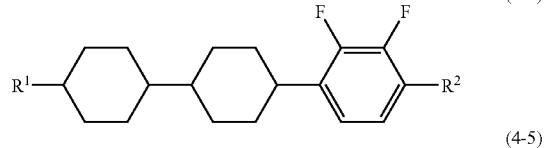

(4-4)

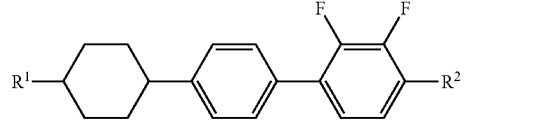

(4-5)

The symbols in these formulae are defined as below. $R^1$ represents an alkyl having a carbon number of from 1 to 10 or an alkenyl having a carbon number of from 2 to 10. $R^2$ represents an alkoxy having a carbon number of from 1 to 10. And $R^3$ represents an alkyl having a carbon number of from 1 to 10, an alkenyl having a carbon number of from 2 to 10, or an alkoxy having a carbon number of from 1 to 10.

Preferred examples of the alkyl are methyl, ethyl, propyl, butyl, pentyl, hexyl, heptyl and octyl. More preferred examples of the alkyl for $R^1$ are ethyl, propyl, butyl, pentyl and heptyl. More preferred examples of the alkyl for $R^3$ are methyl, ethyl and propyl.

Preferred examples of the alkenyl are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl and 5-hexenyl. More preferred examples thereof are vinyl, 1-propenyl, 3-butenyl and 3-pentenyl. Preferred examples of the steric configuration of the —CH=CH— group in the alkenyl depend on the position of the double bond. A trans form is preferred in such an alkenyl as 1-propenyl, 1-butenyl, 1-pentenyl, 1-hexenyl, 3-pentenyl and 3-hexenyl. A cis form is preferred in such an alkenyl as 2-butenyl, 2-pentenyl and 2-hexenyl.

Preferred examples of the alkoxy are methoxy, ethoxy, propoxy, butoxy, pentyloxy, hexyloxy and heptyloxy. More preferred examples thereof are methoxy, ethoxy and butoxy.

In the compound as a component of the liquid crystal composition of the invention, the steric configuration of 1,4-cyclohexylene is preferably a trans form rather than a cis form.

The composition of the invention includes a composition containing only the first to fourth components, and a composition containing another compound in addition to the first to fourth components. Examples of the another compound are a liquid crystal compound other than the first to fourth components, an optically active compound, a dye, an ultraviolet absorbing agent, an antioxidant and an impurity. The liquid crystal compound other than the first to fourth components is mixed with the composition for adjusting the characteristics thereof. The optically active compound is mixed with the composition for inducing a spiral structure of the liquid crystal to induce a twist angle. The dye is mixed with the composition for adapting to a device having a GH (guest host) mode. Examples of the impurity are a synthesis raw material, a by-product material, a reaction solvent and a synthesis catalyst.

Examples of the ultraviolet absorbing agent are a benzophenone ultraviolet absorbing agent, a benzoate ultraviolet absorbing agent and a triazole ultraviolet absorbing agent. Examples of the benzophenone ultraviolet absorbing agent include 2-hydroxy-4-n-octoxybenzophenone. Examples of the benzoate ultraviolet absorbing agent include 2,4-di-tert-butylphenyl-3,5-di-tert-butyl-4-hydroxybenzoate. Examples of the triazole ultraviolet absorbing agent are 2-(2-hydroxy-5-methylphenyl)benzotriazole, 2-[2-hydroxy-3-(3,4,5,6-tetrahydroxyphthalimide-methyl)-5-methylphenyl]benzotriazole and 2-(3-tert-butyl-2-hydroxy-5-methylphenyl)-5-chlorobenzotriazole.

Examples of the antioxidant are a phenol antioxidant and an organic sulfur antioxidant. Examples of the phenol antioxidant are 3,5-di-tert-butyl-4-hydroxytoluene, 2,2'-methylenebis(6-tert-butyl-4-methylphenol), 4,4'-butylidenebis(6-tert-butyl-3-methylphenol), 2,6-di-tert-butyl-4-(2-octadecyloxycarbonyl)ethylphenol and pentaerythritol tetrakis[3-(3,5-di-tert-butyl-4-hydroxyphenyl)propionate]. Examples of the organic sulfur antioxidant are dilauryl-3,3'-thiopropionate, dimyristyl-3,3'-thiopropyonate, distearyl-3,3'-thiopropionate, pentaerythritol tetrakis(3-laurylthiopropionate) and 2-mercaptobenzimidazole.

The amount of the additive, such as the ultraviolet absorbing agent and the antioxidant, is preferably as large as possible for attaining the object. For example, a large amount of the antioxidant can prevent the specific resistance from being lowered upon heating the composition. Under consideration of prevention of adverse affects on the general characteristics of the composition, the proportion of the ultraviolet absorbing agent and the antioxidant is generally from 10 to 500 ppm, preferably from 30 to 300 ppm, and more preferably from 40 to 200 ppm, based on the total weight of the composition.

The major characteristics of the compounds as the components of the composition, and the major effects of the compounds on the composition will be described. The major characteristics of Compound (1-1) to Compound (1-4), Compound (2-1) to Compound (2-3), Compound (3-1) to Compound (3-5) and Compound (4-1) to Compound (4-5) are summarized in Table 2 below. In the table, the symbol L means large or high, M means intermediate, and S means small or low. The symbol 0 means that the compound has substantially no (or extremely small) dielectric anisotropy. The symbols L, M and S are relative evaluations of the compounds. The remark (1) means that the dielectric anisotropy is a negative value. The evaluations for the viscosity, the optical anisotropy and the dielectric anisotropy are made based on values obtained in such a manner that the compound is added to the same liquid crystal composition for measuring the characteristics, and the values are obtained by extrapolation.

TABLE 2

Characteristics of Compounds

| Compound | Upper limit temperature | Viscosity | Optical anisotropy | Dielectric anisotropy | Specific resistance |
|---|---|---|---|---|---|
| (1-1) | S | M | M | M[(1)] | L |
| (1-2) | M | L | L | L[(1)] | L |
| (1-3) | M | L | L | L[(1)] | L |
| (1-4) | M | L | L | L[(1)] | L |
| (2-1) | S | S | S | 0 | L |
| (2-2) | S | S | M | 0 | L |
| (2-3) | L | M | M | 0 | L |
| (3-1) | S | M | M | S[(1)] | L |
| (3-2) | L | M | M | S[(1)] | L |
| (3-3) | L | M | L | S[(1)] | L |
| (3-4) | S | M | M | S[(1)] | L |
| (3-5) | L | M | M | S[(1)] | L |
| (4-1) | S | M | M | M[(1)] | L |
| (4-2) | M | L | L | L[(1)] | L |
| (4-3) | S | M | M | M[(1)] | L |
| (4-4) | L | L | M | L[(1)] | L |
| (4-5) | L | L | L | L[(1)] | L |

The characteristic features of Compound (1-1) to Compound (1-4) as the first component is that the compound has —$OCF_2C_2H_4$— group as a linking group, has a 2,3-difluorophenylene as one of the groups of the cyclic structures, and has an alkoxy as an end group. In the liquid crystal composition of the invention, the first component is used mainly for increasing negatively the dielectric anisotropy and decreasing the lower limit temperature. The characteristic features of Compound (2-1) to Compound (2-3) as the second component is that the compound has no fluorine atom in the structure thereof. In the liquid crystal composition of the invention, the second component is used mainly for decreasing the viscosity, adjusting the upper limit temperature, and decreasing the lower limit temperature. The characteristic features of Compound (3-1) to Compound (3-5) as the third component is that the compound has 2-fluorophenylene or 3-fluorophenylene as one of the groups of the cyclic structures, and an alkoxy as an end group. In the liquid crystal composition of the invention, the third component is used mainly for adjusting the upper limit temperature and decreasing the lower limit temperature. The characteristic features of Compound (4-1) to Compound (4-5) as the fourth component is that the compound has 2,3-difluorophenylene as one of the groups of the cyclic structures, and an alkoxy as an end group. In the liquid crystal composition of the invention, the fourth component is used mainly for increasing negatively the dielectric anisotropy.

By combining the first and second components of the invention, plural characteristic features selected from a wide temperature range of a nematic phase, a low viscosity, an appropriate optical anisotropy a large negative dielectric anisotropy and a large specific resistance can be attained. By adding the third component in addition to the first and second components, or by adding the fourth component in addition to the first, second and third components, plural characteristic features selected from a wide temperature range of a nematic phase, a low viscosity, an appropriate optical anisotropy, a large negative dielectric anisotropy and a large specific resistance can be attained, and a composition having the plural characteristic features in a well-balanced manner can be obtained.

The temperature range of a nematic phase can be enhanced by combining the first and second components of the invention, and in particular, the lower limit temperature of a nematic phase can be decreased by adding the first component in a large amount. It is difficult to obtain the effect by a combination of Compound (4-3), Compound (4-4) or Compound (4-5) as the fourth component with the second component. The temperature range of a nematic phase can be enhanced by adding the third component of the invention in addition to the first and second components, and in particular, the lower limit temperature of a nematic phase can be decreased by adding the first component in a large amount.

The preferred proportions of the components will be described along with reasons therefor. In the case where the liquid crystal composition of the invention contains the first and second components but does not contain the third and fourth components, the proportion of Compound (1-1) to Compound (1-4) based on the total weight of the liquid crystal composition is preferably 10% or more for increasing negatively the dielectric anisotropy or for decreasing the threshold voltage, and is preferably 95% or less for decreasing the lower limit temperature. The proportion is more preferably from 30 to 85%. The proportion of Compound (2-1) to Compound (2-3) based on the total weight of the liquid crystal composition is preferably 5% or more for decreasing the viscosity, and is preferably 90% or less for increasing negatively the dielectric anisotropy or for decreasing the threshold voltage. The proportion is more preferably from 15 to 70%.

In the case where the liquid crystal composition of the invention contains the first and second components and added with Compound (3-1) to Compound (3-5) as the third component but does not contain the fourth component, the proportion of Compound (3-1) to Compound (3-5) based on the total weight of the liquid crystal composition is preferably 5% or more for increasing negatively the dielectric anisotropy or for decreasing the threshold voltage, and is preferably 85% or less for decreasing the lower limit temperature. In this case, the proportion of the first component is from 10 to 90%, and the proportion of the second component is from 5 to 85%. It is preferred that the proportion of the first component is from 40 to 90%, the proportion of the second component is from 5 to 55%, and the proportion of the third component is from 5 to 55%. It is more preferred that the proportion of the first component is from 40 to 70%, the proportion of the second component is from 15 to 50%, and the proportion of the third component is from 15 to 50%.

In the case where the liquid crystal composition of the invention contains the first, second and third components and added with Compound (4-1) to Compound (4-5) as the fourth component, the proportion of Compound (4-1) to Compound (4-5) based on the total weight of the liquid crystal composition is preferably 5% or more for increasing negatively the dielectric anisotropy or for decreasing the threshold voltage, and is preferably 80% or less for decreasing the lower limit temperature. In this case, the proportion of the first component is from 10 to 85%, the proportion of the second component is from 5 to 80%, and the proportion of the third component is from 5 to 80%. It is preferred that the proportion of the first component is from 20 to 65%, the proportion of the second component is from 10 to 55%, the proportion of the third component is from 5 to 50%, and the proportion of the fourth component is from 20 to 65%. It is more preferred that the proportion of the first component is from 20 to 50%, the proportion of the second component is from 15 to 45%, the proportion of the third component is from 10 to 40%, and the proportion of the fourth component is from 25 to 55%.

Preferred embodiments of the compounds as the components will be described.

Among Compound (1-1) to Compound (1-4), Compound (1-1) and Compound (1-2) are preferred, and Compound (1-1) is more preferred. Among Compound (2-1) to Compound (2-3), Compound (2-1) and Compound (2-3) are preferred, and Compound (2-3) is more preferred. Among Compound (3-1) to Compound (3-5), Compound (3-1) to Compound (3-3) are preferred, and Compound (3-1) and Compound (3-2) are more preferred. Among Compound (4-1) to Compound (4-5), Compound (4-3) to Compound (4-5) are preferred, and Compound (4-4) and Compound (4-5) are more preferred.

The synthesis methods for the compounds as the components will be described. The compounds can be synthesized by the known methods. Examples of the synthesis methods will be described. Compound (1-1) to Compound (1-4) can be synthesized by a method obtained by modifying the method disclosed in JP-A-9-278698 or JP-A-2003-2858. Compound (2-1) can be synthesized by the method disclosed in JP-A-59-70624 or JP-A-60-16940. Compound (4-1) to Compound (4-5) can be synthesized by a method obtained by modifying the method disclosed in JP-A-6-228037.

The compounds which the synthesis methods therefor are not shown herein can be synthesized by the methods disclosed, for example, in Organic Synthesis, published by John Wiley & Sons, Inc., Organic Reactions, published by John Wiley & Sons, Inc., Comprehensive Organic Synthesis, published by Pergamon Press, and Shin Jikken Kagaku Koza (New Lectures on Experimental Chemistry), published by Maruzen Co., Ltd. The composition can be prepared from the compounds thus obtained through the known method. For example, the compounds as the components are mixed and dissolved with each other by heating.

The composition of the invention mainly has an optical anisotropy of from 0.07 to 0.13 and a dielectric anisotropy of from −6.0 to −2.0. The dielectric anisotropy is preferably in a range of from −5.0 to −2.5. A composition having an optical anisotropy of from 0.05 to 0.20 may be prepared by controlling the proportions of the compounds as the components or by mixing another compound. Therefore, the composition is suitable for an AM device having a VA mode, an IPS mode and the like. The composition is suitable particularly for an AM device having a VA mode.

The direction of the electric field in a device having such a mode as a TN mode is vertical to the liquid crystal layer. On the other hand, the direction of the electric field in a device having such a mode as a VA mode and an IPS mode is in parallel to the liquid crystal layer. The structure of the device having a VA mode has been reported in K. Ohmuro, S. Kataoka, T. Sasaki and Y. Koike, SID '97 Digest of Technical Papers, vol. 28, p. 845 (1997). The structure of the device having an IPS mode has been reported in International Publication 91/10936 (patent family: U.S. Pat. No. 5,576,867). The composition of the invention may be applied to these devices.

The composition can be used not only in an AM device having such a mode as PC, TN, STN and OCB modes, but also in a PM device having such a mode as PC, TN, STN, OCB, VA and IPS modes. These AM device and PM device may be any of the reflection type, the transmission type and the semitransmission type. The composition may be applied to an NCAP (nematic curvilinear aligned phase) device produced by encapsulating the composition in microcapsules, and a PD (polymer dispersed) device having a three-dimensional polymer network formed in the composition, such as a PN (polymer network) device.

EXAMPLES

Synthesis Examples for the compounds used in the invention will be firstly described. The compounds in Synthesis Examples are shown by structural formulae. In the structural formulae, the steric configuration of 1,4-cyclohexylene is a trans form. In the phase transfer temperatures of the compounds, the symbols C, N and I represent a crystal, a nematic phase and an isotropic phase, respectively. The phase transfer in parentheses means a monotropic phase. The unit for the temperature is degree centigrade (° C.). The resulting compounds were identified by data including a nuclear magnetic resonance spectrum and a mass spectrum. In the nuclear magnetic resonance spectrum, the symbol s means a singlet, d means a doublet, t means a triplet, q means a quartet, and m means a multiplet. THF represents tetrahydrofuran, DMF represents N,N-dimethylformamide, and MEK represents methyl ethyl ketone. The unit for volume mL means milliliter.

In the measurements of Compound (1-1) to Compound (1-4) for the dielectric anisotropy (Δε, 25° C.) and the optical anisotropy (Δn, 25° C.), a liquid crystal composition M having a nematic phase, which was prepared by mixing the following five compounds, was used.

(Composition M)

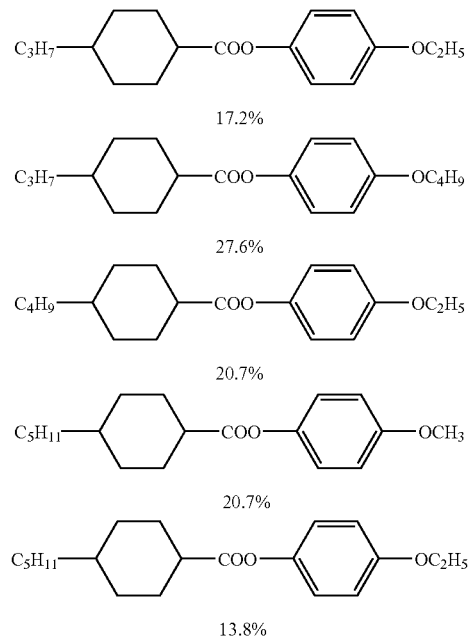

The physical properties of the composition M were as follows.
Upper limit temperature (NI)=74.0° C.
Viscosity (η$_{20}$)=18.9 mPa·s
Optical anisotropy (Δn)=0.087
Dielectric anisotropy (Δε)=−1.3

15% by weight of Compound (1-1) to Compound (1-4) were added to 85% by weight of the composition to prepare specimens. The measurement method therefor will be described later. The values obtained by the measurement were extrapolated based on the physical property values of the liquid crystal composition M and the weight ratio of Compound (1-1) to Compound (1-4) and the liquid crystal composition M, so as to calculate the values of dielectric anisotropy and optical anisotropy.

Synthesis Example 1

Synthesis of 4-(4-propylcyclohexyl)-1-(3-[4-ethoxy-2,3-difluorophenyl]-1,1-difluoropropyloxy)benzene (1-2-4)

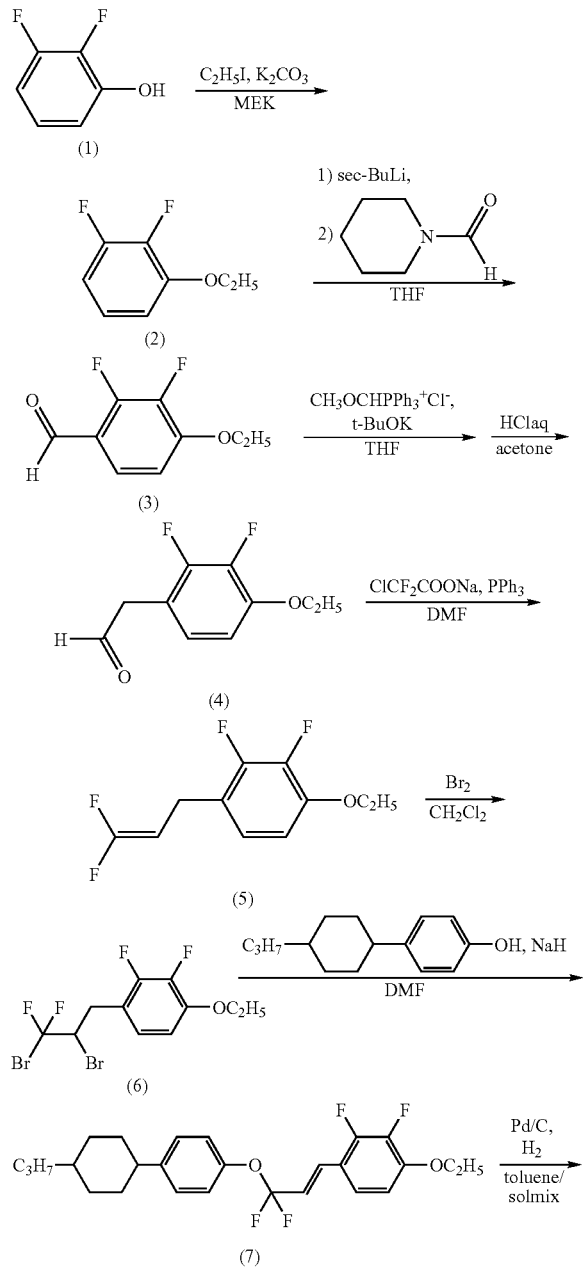

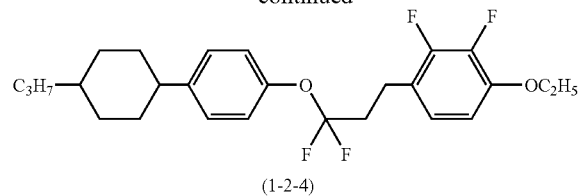

(First Step) 180 g of iodoethane dissolved in a solution containing 128 g of potassium carbonate in 500 mL MEK was added to a solution of 103.3 g of Compound (1) dissolved in 770 mL of MEK, and the mixture was refluxed under heating for 4 hours. The reaction was terminated by adding water, and diethyl ether was added thereto. The aqueous layer was extracted with diethyl ether, and a mixture of the extract and the organic layer was washed with a 2N sodium hydroxide aqueous solution, followed by drying over anhydrous magnesium sulfate. The solvent was distilled out under reduced pressure to obtain 128.6 g of Compound (2). $^1$H-NMR (CDCl$_3$): δ (ppm); 7.00-6.94 (m, 1H), 6.74-6.70 (m, 2H), 4.10 (q, 2H), 1.44 (t, 3H)

(Second Step)

Under a nitrogen atmosphere at -78° C., 300 mL of sec-butyllithium (0.96 M!L) was added dropwise to a solution of 30.2 g of Compound (2) dissolved in 100 mL of THF at -78° C., and the mixture was stirred at the same temperature for 2 hours. A solution of 32.6 g of N-formylpiperidine dissolved in 70 mL of THF was added dropwise thereto at -78° C., and the mixture was stirred at the same temperature for 1 hour and further stirred at room temperature over night. Water was added thereto, and an organic layer was separated. An aqueous layer was extracted with toluene, and a mixture of the extract and the organic layer was washed with a saturated sodium chloride aqueous solution and dried over anhydrous magnesium sulfate. The solvent was distilled out under reduced pressure to obtain 28.2 g of Compound (3). $^1$H-NMR (CDCl$_3$): δ (ppm); 10.18 (s, 1H), 7.60 (td, 1H), 6.85 (td, 1H), 4.23 (q, 2H), 1.51 (t, 3H)

(Third Step) Under a nitrogen atmosphere at -78° C., 22.0 g of potassium t-butoxide was added to 47.7 g of methoxymethyltriphenylphosphonium chloride suspended in 410 mL of THF, and the mixture was stirred at the same temperature for 1 hour. Subsequently, a solution of 28.2 g of Compound (3) dissolved in 140 mL of THF was added dropwise thereto at -78° C., and the mixture was stirred at the same temperature for 1 hour and further stirred at room temperature over night. Heptane was added to the reaction solution, which was then filtered through silica gel. The solvent was distilled out under reduced pressure from the filtrate, and the residue was dissolved in 510 mL of acetone. 200 mL of 3N hydrochloric acid was added to the solution, and the mixture was stirred over night. After adding water thereto, an aqueous layer was extracted with toluene, and a mixture of the extract and an organic layer was washed with a saturated sodium chloride aqueous solution and dried over anhydrous magnesium sulfate. The solvent was distilled out under reduced pressure to obtain 25.2 g of Compound (4). $^1$H-NMR (CDCl$_3$): δ (ppm); 9.74 (q, 1H), 6.84 (td, 1H), 6.73 (td, 1H), 4.12 (q, 2H), 3.71 (t, 2H), 1.46 (t, 3H)

(Fourth Step)

Under a nitrogen atmosphere, a solution of 57.6 g of sodium chlorodifluoroacetate dissolved in 250 mL of DMF was slowly added dropwise to a solution of 25.2 g of Compound (4) dissolved in 500 mL of DMF and 49.6 g of triphenylphosphine at 120° C., and the mixture was stirred at the same temperature for 1 hour. The mixture was cooled to room temperature, and water was added thereto. An aqueous layer was extracted with diethyl ether, and a mixture of the extract and an organic layer was washed with a saturated sodium chloride aqueous solution and dried over anhydrous magnesium sulfate. The solvent was distilled out under reduced pressure to obtain 13.1 g of Compound (5).
$^1$H-NMR (CDCl$_3$): δ(ppm); 7.25-7.14 (m, 1H), 6.82 (td, 1H), 6.66 (td, 1H), 4.09 (q, 2H), 3.28 (dd, 2H), 1.44 (t, 3H)

(Fifth Step)

Under a nitrogen atmosphere at −78° C., a solution of 7.15 g of bromine dissolved in 36 mL of dichloromethane was slowly added dropwise to a solution of 8.74 g of Compound (5) dissolved in 360 mL of dichloromethane, and the mixture was stirred at 0° C. for 30 minutes. A saturated sodium sulfite aqueous solution was added thereto, and an organic layer was separated. An aqueous layer was extracted with dichloromethane, and a mixture of the extract and the organic layer was dried over anhydrous magnesium sulfate. The solvent was distilled out under reduced pressure to obtain 12.6 g of Compound (6).
$^1$H-NMR (CDCl$_3$): δ (ppm); 6.91 (td, 1H), 6.71 (td, 1H), 4.12 (q, 2H), 3.71 (dd, 1H), 3.02 (dd, 2H), 1.46 (t, 3H)

(Sixth Step)

Under a nitrogen atmosphere, 0.98 g of 60% sodium hydride was added to a solution of 4.87 g of 4-(4-propyl-cyclohexyl)phenol dissolved in 120 mL of DMF, and the mixture was heated at 60° C. under stirring for 1 hour. The reaction solution was cooled to room temperature, to which a solution of 8.00 g of Compound (6) dissolved in 120 mL of DMF was added dropwise. After stirring at room temperature for 1 hour, 0.98 g of 60% sodium hydride was added thereto, and the mixture was heated at 60° C. under stirring for 2 hours. After cooling the reaction solution to room temperature, water was added thereto, and an aqueous layer was extracted with diethyl ether. A mixture of the extract and an organic layer was washed with a 2N sodium hydroxide aqueous solution and a saturated sodium chloride aqueous solution and dried over anhydrous magnesium sulfate. The solvent was distilled out under reduced pressure to obtain 6.14 g of Compound (7).
$^1$H-NMR (CDCl$_3$): δ (ppm); 7.21-7.13 (m, 5H), 6.73 (td, 1H), 6.64 (d, 1H), 6.36 (dt, 1H), 4.14 (q, 2H), 2.48-2.43 (m, 1H), 1.87 (td, 4H), 1.47 (t, 3H), 1.46-1.19 (m, 7H), 1.04 (q, 2H), 0.90 (t, 3H)

(Seventh Step)

0.3 g of Pd/C was added to a solution of 6.14 g of Compound (7) dissolved in 300 mL of a mixed solvent of toluene/Solmix (1/1), and the mixture was stirred under a hydrogen atmosphere at room temperature until hydrogen was not absorbed. After removing the catalyst, the solvent was distilled out under reduced pressure, and the product was purified by silica gel column chromatography to obtain 3.86 g of Compound (1-2-4) as in the form of colorless crystals. C 50° C. N 101.5° C. I
$^1$H-NMR (CDCl$_3$): δ (ppm); 7.12 (dd, 4H), 6.87 (td, 1H), 6.67 (td, 1H), 4.09 (q, 2H), 2.94 (t, 2H), 2.48-2.38 (m, 3H), 1.87 (td, 4H), 1.44 (t, 3H), 1.43-1.18 (m, 7H), 1.04 (q, 2H), 0.90 (t, 3H)

Synthesis Example 2

Synthesis of 4-(4-butylcyclohexyl)-1-(3-[4-ethoxy-2,3-difluorophenyl]-1,1-difluoropropyloxy)benzene (1-2-6)

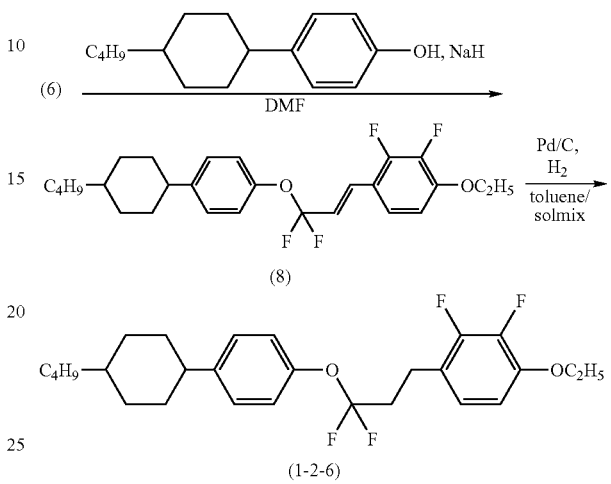

(First Step)

Under a nitrogen atmosphere, 0.98 g of 60% sodium hydride was added to a solution of 5.18 g of 4-(4-butylcyclohexyl)phenol dissolved in 60 mL of DMF, and the mixture was heated at 60° C. under stirring for 1 hour. The reaction solution was cooled to room temperature, to which a solution of 8.00 g of Compound (6) dissolved in 120 mL of DMF was added dropwise. After stirring at room temperature for 1 hour, 0.98 g of 60% sodium hydride was added thereto, and the mixture was heated at 60° C. under stirring for 2 hours. After cooling the reaction solution to room temperature, water was added thereto, and an aqueous layer was extracted with diethyl ether. A mixture of the extract and an organic layer was washed with a 2N sodium hydroxide aqueous solution and a saturated sodium chloride aqueous solution and dried over anhydrous magnesium sulfate. The solvent was distilled out under reduced pressure to obtain 3.65 g of Compound (8).
$^1$H-NMR (CDCl$_3$): δ (ppm); 7.21-7.13 (m, 5H), 6.73 (td, 1H), 6.64 (d, 1H), 6.36 (dt, 1H), 4.14 (q, 2H), 2.48-2.43 (m, 1H), 1.87 (td, 4H), 1.47 (t, 3H), 1.46-1.19 (m, 9H), 1.04 (q, 2H), 0.90 (t, 3H)

(Second Step)

0.2 g of Pd/C was added to a solution of 3.65 g of Compound (8) dissolved in 200 mL of a mixed solvent of toluene/Solmix (1/1), and the mixture was stirred under a hydrogen atmosphere at room temperature until hydrogen was not absorbed. After removing the catalyst, the solvent was distilled out under reduced pressure, and the product was purified by silica gel column chromatography to obtain 3.06 g of Compound (1-2-6) as in the form of colorless crystals. C 47.1° C. N 96.1° C. I
$^1$H-NMR (CDCl$_3$): δ (ppm); 7.12 (dd, 4H), 6.87 (td, 1H), 6.67 (td, 1H), 4.09 (q, 2H), 2.94 (t, 2H), 2.48-2.38 (m, 3H), 1.87 (td, 4H), 1.44 (t, 3H), 1.43-1.18 (m, 9H), 1.04 (q, 2H), 0.90 (t, 3H)

Synthesis Example 3

Synthesis of 4-(4-pentylcyclohexyl)-1-(3-[4-ethoxy-2,3-difluorophenyl]-1,1-difluoropropyloxy)benzene (1-2-9)

(First Step)

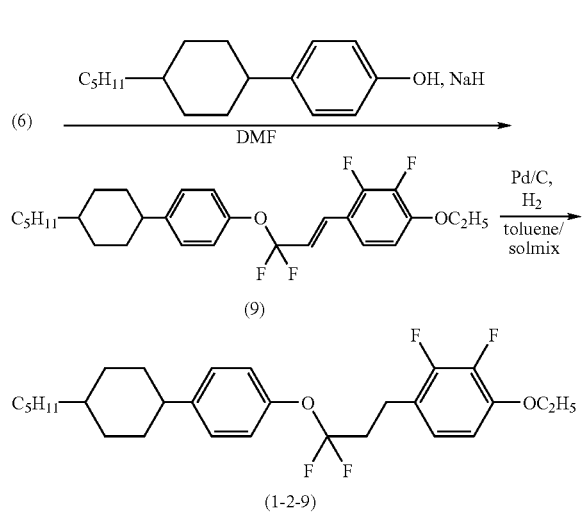

Under a nitrogen atmosphere, 0.98 g of 60% sodium hydride was added to a solution of 5.49 g of 4-(4-pentylcyclohexyl)phenol dissolved in 60 mL of DMF, and the mixture was heated at 60° C. under stirring for 1 hour. The reaction solution was cooled to room temperature, to which a solution of 8.00 g of Compound (6) dissolved in 120 mL of DMF was added dropwise. After stirring at room temperature for 1 hour, 0.98 g of 60% sodium hydride was added thereto, and the mixture was heated at 60° C. under stirring for 2 hours. After cooling the reaction solution to room temperature, water was added thereto, and an aqueous layer was extracted with diethyl ether. A mixture of the extract and an organic layer was washed with a 2N sodium hydroxide aqueous solution and a saturated sodium chloride aqueous solution and dried over anhydrous magnesium sulfate. The solvent was distilled out under reduced pressure to obtain 4.53 g of Compound (9).

$^1$H-NMR (CDCl$_3$): δ (ppm); 7.21-7.13 (m, 5H), 6.73 (td, 1H), 6.64 (d, 1H), 6.36 (dt, 1H), 4.14 (q, 2H), 2.48-2.43 (m, 1H), 1.87 (td, 4H), 1.47 (t, 3H), 1.46-1.19 (m, 11H), 1.04 (q, 2H), 0.90 (t, 3H)

(Second Step)

0.2 g of Pd/C was added to a solution of 4.53 g of Compound (9) dissolved in 200 mL of a mixed solvent of toluene/Solmix (1/1), and the mixture was stirred under a hydrogen atmosphere at room temperature until hydrogen was not absorbed. After removing the catalyst, the solvent was distilled out under reduced pressure, and the product was purified by silica gel column chromatography to obtain 3.12 g of Compound (1-2-9) as in the form of colorless crystals. C 49.9° C. N 104.9° C. I $^1$H-NMR (CDCl$_3$): δ (ppm); 7.12 (dd, 4H), 6.87 (td, 1H), 6.67 (td, 1H), 4.09 (q, 2H), 2.94 (t, 2H), 2.48-2.38 (m, 3H), 1.87 (td, 4H), 1.44 (t, 3H), 1.43-1.18 (m, 11H), 1.04 (q, 2H), 0.90 (t, 3H)

Synthesis Example 4

Synthesis of 4-(4-ethylcyclohexyl)-1-(3-[4-ethoxy-2,3-difluorophenyl]-1,1-difluoropropyloxy)benzene (1-2-1)

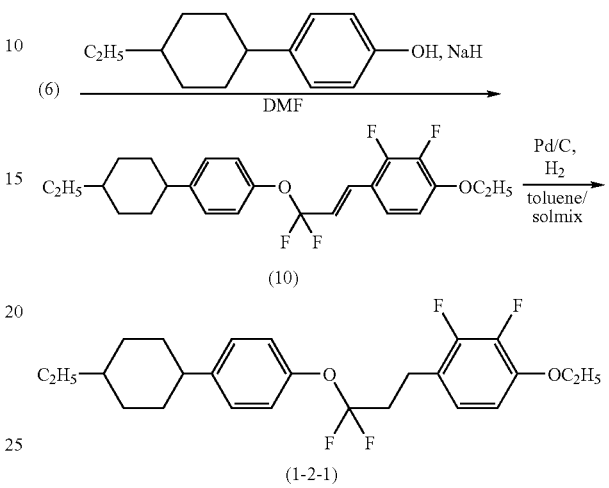

(First Step)

Under a nitrogen atmosphere, 0.98 g of 60% sodium hydride was added to a solution of 4.56 g of 4-(4-ethylcyclohexyl)phenol dissolved in 60 mL of DMF, and the mixture was heated at 60° C. under stirring for 1 hour. The reaction solution was cooled to room temperature, to which a solution of 8.00 g of Compound (6) dissolved in 120 mL of DMF was added dropwise. After stirring at room temperature for 1 hour, 0.98 g of 60% sodium hydride was added thereto, and the mixture was heated at 60° C. under stirring for 2 hours. After cooling the reaction solution to room temperature, water was added thereto, and an aqueous layer was extracted with diethyl ether. A mixture of the extract and an organic layer was washed with a 2N sodium hydroxide aqueous solution and a saturated sodium chloride aqueous solution and dried over anhydrous magnesium sulfate. The solvent was distilled out under reduced pressure to obtain 3.37 g of Compound (10).

$^1$H-NMR (CDCl$_3$): δ (ppm); 7.21-7.13 (m, 5H), 6.73 (td, 1H), 6.64 (d, 1H), 6.36 (dt, 1H), 4.14 (q, 2H), 2.48-2.43 (m, 1H), 1.87 (td, 4H), 1.47 (t, 3H), 1.46-1.19 (m, 5H), 1.04 (q, 2H), 0.90 (t, 3H)

(Second Step)

0.17 g of Pd/C was added to a solution of 3.37 g of Compound (10) dissolved in 200 mL of a mixed solvent of toluene/Solmix (1/1), and the mixture was stirred under a hydrogen atmosphere at room temperature until hydrogen was not absorbed. After removing the catalyst, the solvent was distilled out under reduced pressure, and the product was purified by silica gel column chromatography to obtain 3.10 g of Compound (1-2-1) as in the form of colorless crystals. C 83.5° C. (N 71.8° C.) I $^1$H-NMR (CDCl$_3$): δ (ppm); 7.12 (dd, 4H), 6.87 (td, 1H), 6.67 (td, 1H), 4.09 (q, 2H), 2.94 (t, 2H), 2.48-2.38 (m, 3H), 1.87 (td, 4H), 1.44 (t, 3H), 1.43-1.18 (m, 5H), 1.04 (q, 2H), 0.90 (t, 3H)

Synthesis Example 5
Compound (1-1-1) to Compound (1-4-8) shown below are produced in the same manner as in Synthesis Examples 1 to 4. The compounds synthesized in Synthesis Examples 1 to 4 are also shown.
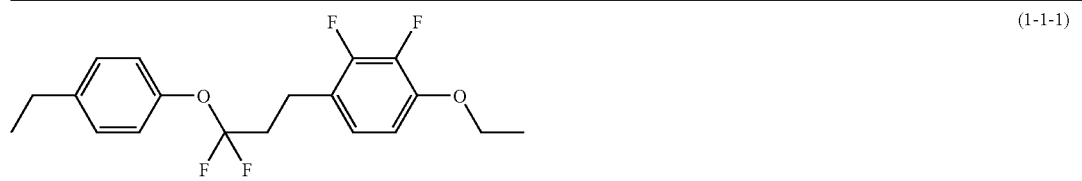
(1-1-1)
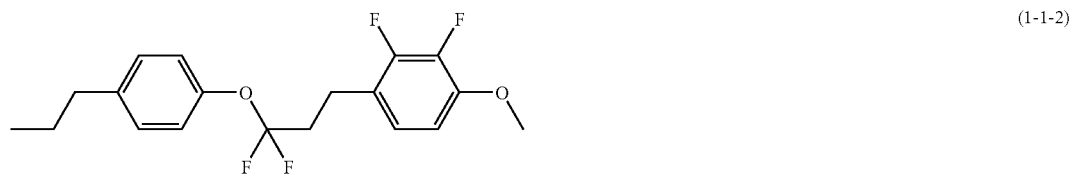
(1-1-2)
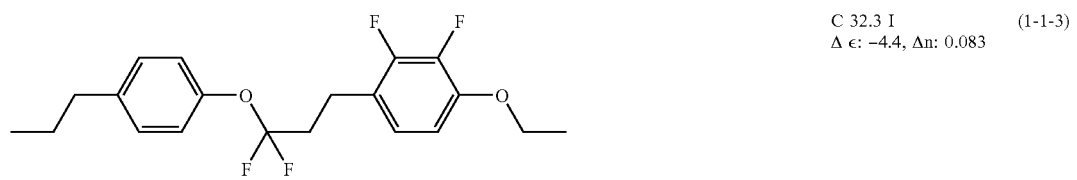
C 32.3 I
Δε: −4.4, Δn: 0.083
(1-1-3)
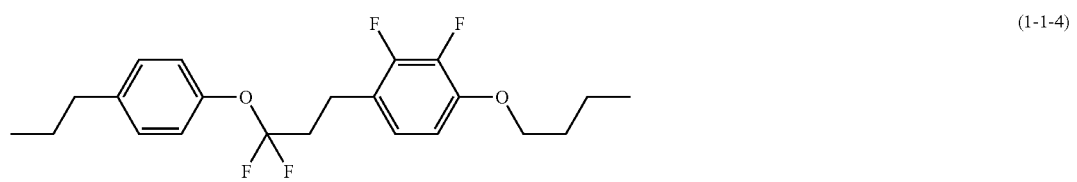
(1-1-4)
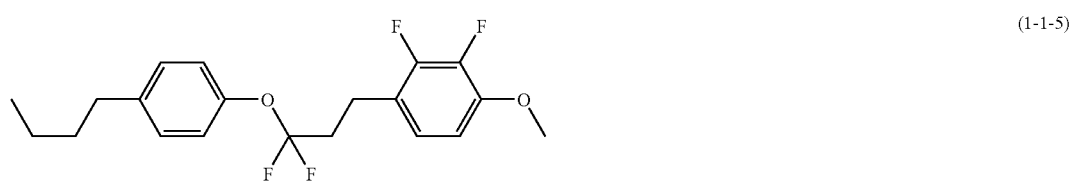
(1-1-5)
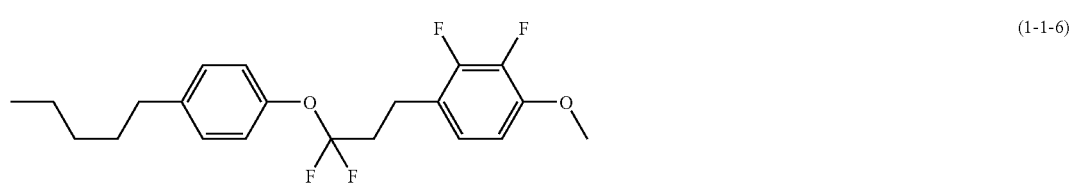
(1-1-6)
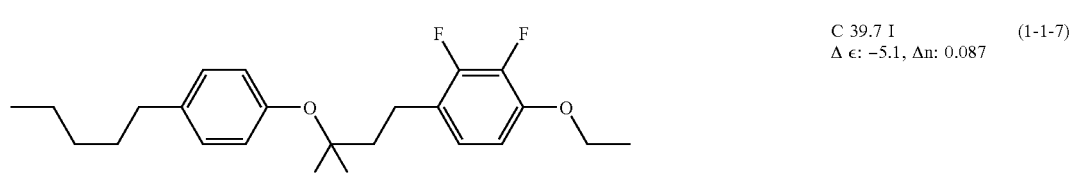
C 39.7 I
Δε: −5.1, Δn: 0.087
(1-1-7)
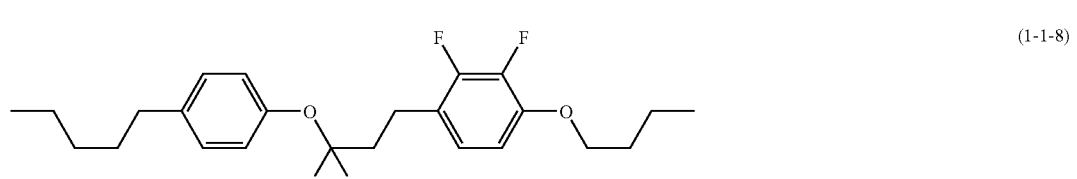
(1-1-8)

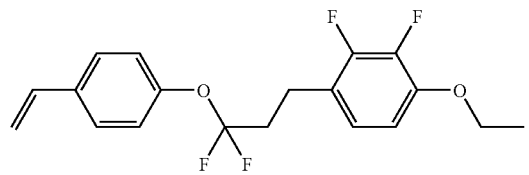 (1-1-9)
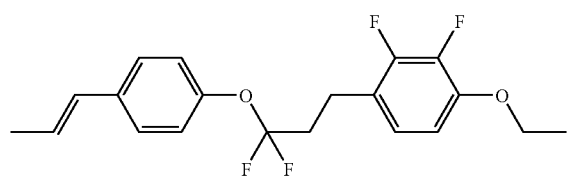 (1-1-10)
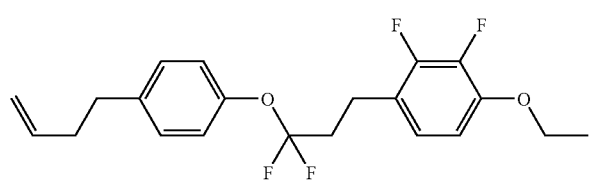 (1-1-11)
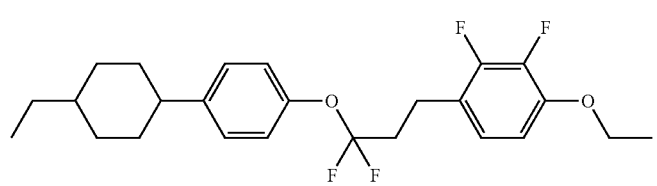
C 83.5 (N71.8) I (1-2-1)
Δ ε: −5.0, Δ n: 0.102
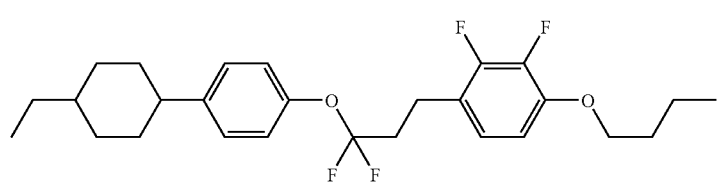 (1-2-2)
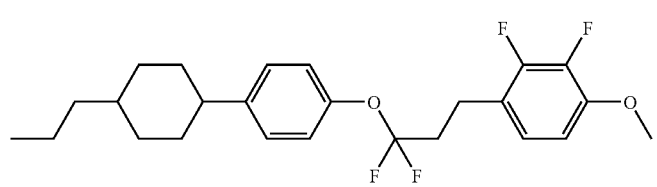 (1-2-3)
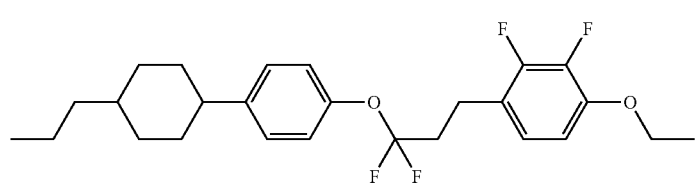
C 50.0 N 101.5 I (1-2-4)
Δ ε: −5.5, Δn: 0.120
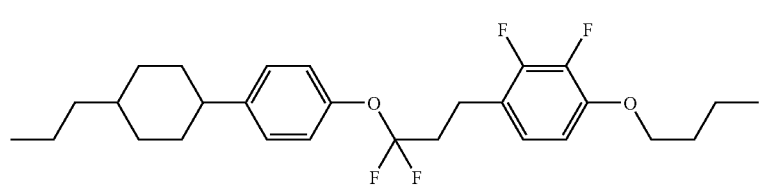
C 76.3 N 92.4 I (1-2-5)
Δ ε: −4.3, Δn: 0.110

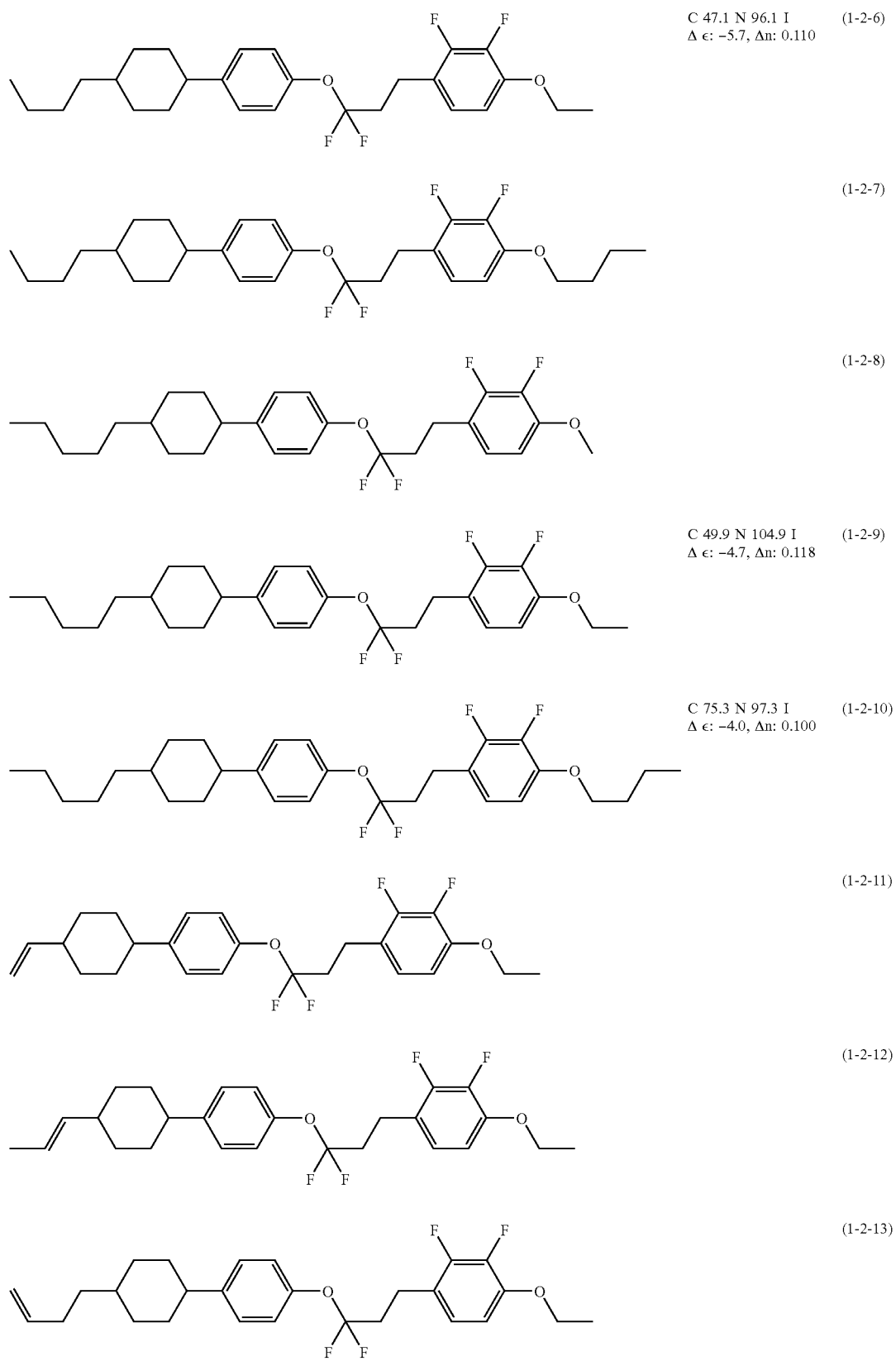

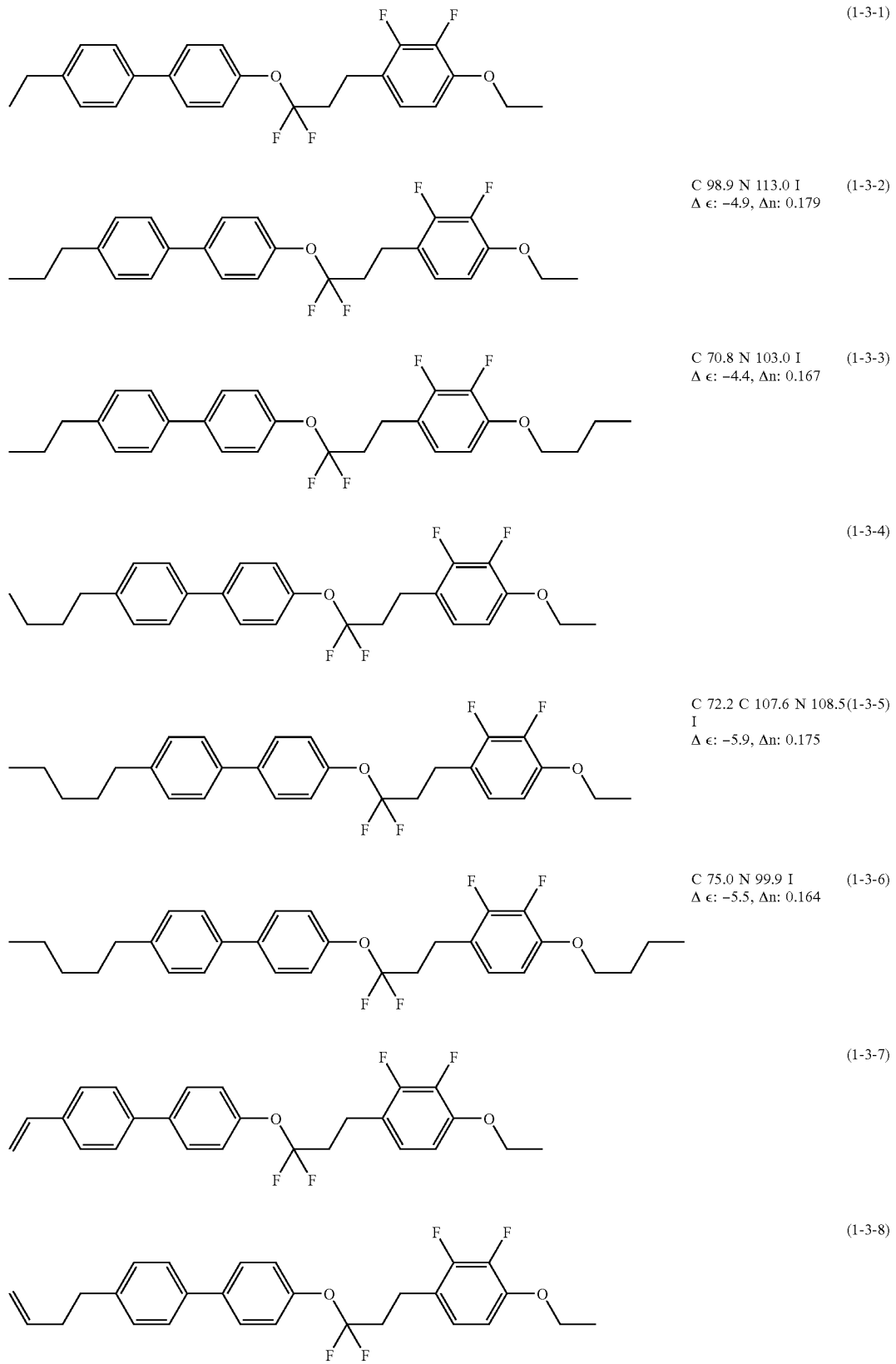
(1-3-1)
C 98.9 N 113.0 I (1-3-2)
Δε: −4.9, Δn: 0.179
C 70.8 N 103.0 I (1-3-3)
Δε: −4.4, Δn: 0.167
(1-3-4)
C 72.2 C 107.6 N 108.5 (1-3-5) I
Δε: −5.9, Δn: 0.175
C 75.0 N 99.9 I (1-3-6)
Δε: −5.5, Δn: 0.164
(1-3-7)
(1-3-8)

-continued

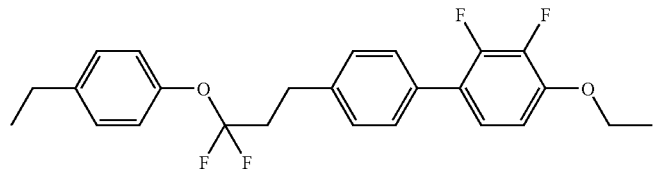 (1-4-1)

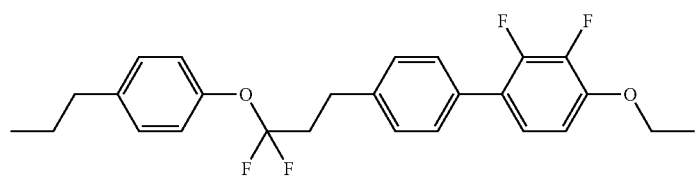 (1-4-2)
C 52.7 C 59.0 N 97.4 I
Δ ε: −4.7, Δn: 0.166

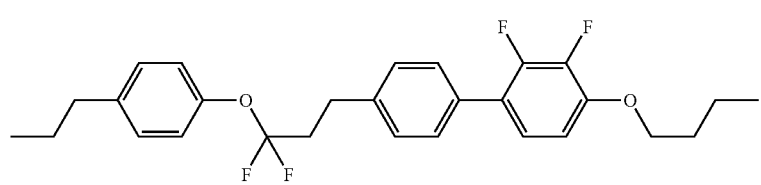 (1-4-3)

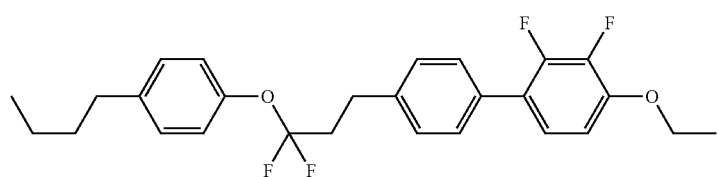 (1-4-4)

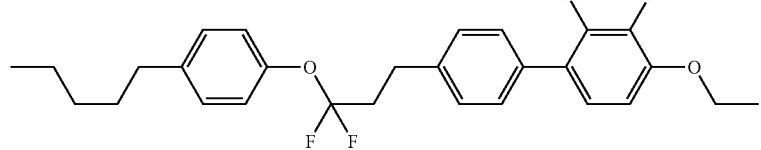 (1-4-5)

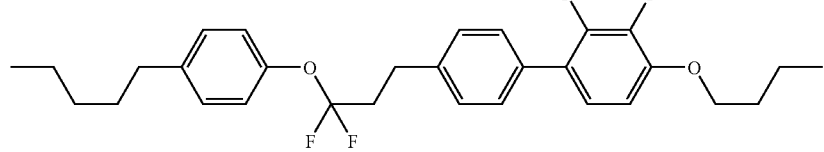 (1-4-6)

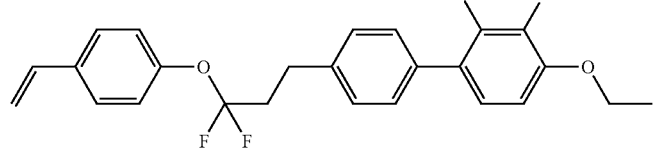 (1-4-7)

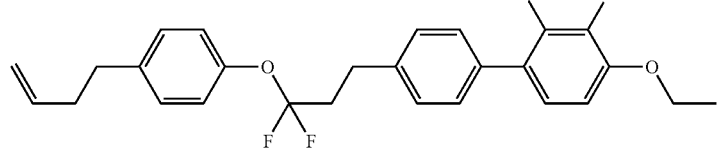 (1-4-8)

The composition of the invention will be described in detail with reference to Examples and Comparative Examples. The compounds in Examples and Comparative Examples are represented by symbols based on the definitions shown in Table 3 below. In Table 3, the steric configuration of 1,4-cyclohexylene is a trans form. In Examples and Comparative Examples, the numbers in parentheses following the symbols correspond to the number of the preferred compounds. The symbol (−) means other compounds. The proportions of the compounds in the composition are in terms of percentage by weight (% by weight) based on the total weight of the composition. The characteristics of the compositions are shown at the last of Examples and Comparative Examples. The expression system where the compound is represented by R-(A₁)-Z₁- . . . -Zₙ-(Aₙ)-X are shown in Table 3.

TABLE 3

| | Symbol |
|---|---|
| 1) Left terminal group R— | |
| $C_nH_{2n+1}$— | n- |
| $CH_2$=CH— | V- |
| $C_nH_{2n+1}CH$=CH— | nV- |
| $CH_2$=$CHC_nH_{2n}$— | Vn- |
| 2) Ring structure —$A_n$— | |
|  | B |
| 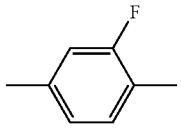 | B(3F) |
| 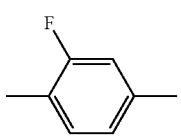 | B(2F) |
| 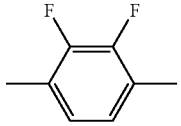 | B(2F, 3F) |
|  | H |
| 3) Bonding group —$Z_n$— | |
| —$C_2H_4$— | 2 |
| —$CH_2O$— | 1O |
| —$CF_2O$— | $CF_2O$ |
| —$OCF_2$— | $OCF_2$ |
| —$OCF_2C_2H_4$— | $OCF_22$ |
| 4) Right terminal group —X | |
| —$C_nH_{2n+1}$ | -n |
| —$OC_nH_{2n+1}$ | -On |
| —$C_nH_{2n}OC_mH_{2m+1}$ | -nOm |
| —CH=$CH_2$ | -V |
| —$C_nH_{2n}CH$=$CH_2$ | -nV |
| 5) Examples of expression | |

Example 1; 5-HBOCF₂2B(2F, 3F)—O2

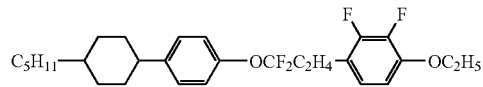

Example 2; V2-HHB-1

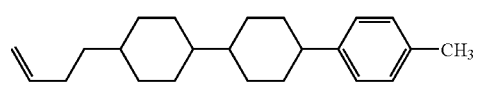

Example 3; 3-HHB(2F, 3F)—O2

TABLE 3-continued

| | Symbol |
|---|---|

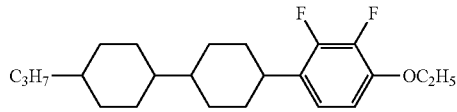

Example 4; 3-H1OB(2F)—O4

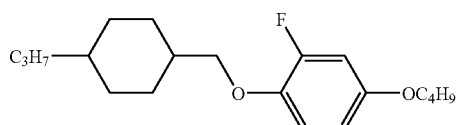

The measurements of the characteristics were carried out according to the following methods. Most of these methods are the methods disclosed in EIAJ (Standard of Electric Industries Association of Japan) ED-2521 or methods obtained by modifying them.

(1) Upper Limit Temperature of Nematic Phase NI (° C.)

A specimen was placed on a hot plate of a melting point measuring device equipped with a polarizing microscope, and heated at a rate of 1° C. per minute. A temperature, at which a part of the specimen changed from a nematic phase to an isotropic liquid, was measured. The upper limit temperature of a nematic phase is sometimes abbreviated as an upper limit temperature.

(2) Lower Limit Temperature of Nematic Phase Tc (° C.)

A specimen having a nematic phase was stored in freezers at 0° C., −10° C., −20° C., −30° C. and −40° C. respectively for 10 days, and then the liquid crystal phase was observed. For example, in the case where the specimen maintained a nematic phase at −20° C. but changed to crystals or a smectic phase at −30° C., Tc was expressed as <−20° C. The lower limit temperature of a nematic phase is sometimes abbreviated as a lower limit temperature.

(3) Optical Anisotropy Δn (Measured at 25° C.)

The measurement was carried out by using light having a wavelength of 589 nm with an Abbe refractometer having a polarizing plate attached to an eyepiece. The surface of the main prism was rubbed in one direction, and the specimen was dropped on the main prism. The refractive index nil was measured in the case where the polarizing direction was in parallel to the rubbing direction. The refractive index n⊥ was measured in the case where the polarizing direction was vertical to the rubbing direction. The optical anisotropy Δn was calculated by the equation Δn=n∥−n⊥.

(4) Viscosity η (mPa·s) (Measured at 20° C.)

The measurement was carried out by using an E-type viscometer.

(5) Dielectric Anisotropy Δε (Measured at 25° C.)

(5-1) Vertical Orientation Process

A solution of octadecyltriethoxysilane (0.16 mL) dissolved in ethanol (20 mL) was coated on a glass substrate having been well cleaned. The glass substrate was rotated with a spinner and then heated to 150° C. for 1 hour. A VA device having a distance (cell gap) of 20 μm was fabricated with two sheets of the glass substrates.

(5-2) Horizontal Orientation Process

A polyimide orientation film was prepared on a glass substrate. After subjecting to a rubbing treatment, a TN device having a distance between two sheets of the glass substrates of 9 μm and a twisted angle of 80° was fabricated.

(5-3) Measurement

A specimen was charged in the VA device, on which a voltage of 0.5 V (1 kHz, sine wave) was applied thereto, and a dielectric constant ($\epsilon\|$) in the major axis direction of the liquid crystal molecule was measured. A specimen was charged in the TN device, on which a voltage of 0.5 V (1 kHz, sine wave) was applied thereto, and a dielectric constant ($\epsilon\perp$) in the minor axis direction of the liquid crystal molecule was measured. The dielectric anisotropy $\Delta\epsilon$ was calculated by the equation $\Delta\epsilon=\epsilon\|-\epsilon\perp$. A composition having a negative dielectric anisotropy was measured in the method.

(6) Voltage Holding Ratio VHR (%) (Measured at 25° C. and 100° C.)

A specimen was charged in a TN device having a polyimide orientation film and having a distance between two glass substrate (cell gap) of 6 μm. A waveform a voltage applied to the TN device at 25° C. was observed with a cathode ray oscilloscope, and an area surrounded by the voltage curve and the abscissa per unit cycle was obtained. The area was obtained in the same manner from a waveform obtained after removing the TN device. The two area values thus obtained were compared to calculate a voltage holding ratio. The voltage holding ratio thus obtained was designated as VHR-1. Subsequently, the TN device was heated to 100° C. for 250 hours. After cooling the device to 25° C., the voltage holding ratio was measured in the same manner. The voltage holding ratio obtained after heating was designated as VHR-2. The heating test was carried out as an alternative to the use for a long period of time.

Comparative Example 1

A composition having the following formulation containing the second and fourth components of the invention was prepared, and the characteristics thereof were measured in the aforementioned manner.

| 3-HH-4 | (2-1) | 7% |
|---|---|---|
| 3-HH-5 | (2-1) | 6% |
| 3-HB—O2 | (2-2) | 8% |
| 3-HB-3 | (2-2) | 9% |
| 3-HB(2F,3F)—O2 | (4-3) | 14% |
| 5-HB(2F,3F)—O2 | (4-3) | 12% |
| 3-HHB(2F,3F)—O2 | (4-4) | 8% |
| 5-HHB(2F,3F)—O2 | (4-4) | 8% |
| 2-HHB(2F,3F)-1 | — | 14% |
| 3-HHB(2F,3F)-1 | — | 14% |

NI=67.9° C.; Tc<−10° C.; $\Delta$n=0.080; $\Delta\epsilon$=−3.0;

$\eta$=19.9 mPa·s; VHR-1=99.4%

Comparative Example 2

The composition of Example 54 of Patent Document 2, JP-A-2003-2858 (patent family: U.S. Pat. No. 6,544,604B), having the following formulation was prepared, and the characteristics thereof were measured in the aforementioned manner. The composition contains Compound (1-2) of the first component, Compound (2-1) of the second component, and Compound (4-3) and Compound (4-4) of the fourth component, of the invention.

| 3-HBOCF$_2$2B(2F,3F)—O2 | (1-2) | 14% |
|---|---|---|
| 3-HH-2 | (2-1) | 5% |
| 3-HH-4 | (2-1) | 6% |
| 3-HH—O1 | (2-1) | 4% |
| 3-HH—O3 | (2-1) | 5% |
| 5-HH—O1 | (2-1) | 4% |
| 3-HB(2F,3F)—O2 | (4-3) | 12% |
| 5-HB(2F,3F)—O2 | (4-3) | 11% |
| 5-HHB(2F,3F)—O2 | (4-4) | 15% |
| 3-HHB(2F,3F)-2 | — | 24% |

NI=78.6° C.; Tc<−10° C.; $\Delta$n=0.080; $\Delta\epsilon$=−3.3;

$\eta$=24.4 mPa·s

Example 1

A liquid crystal composition having the following formulation was prepared.

| 3-BOCF$_2$2B(2F,3F)—O2 | (1-1) | 15% |
|---|---|---|
| 5-BOCF$_2$2B(2F,3F)—O2 | (1-1) | 15% |
| 3-HBOCF$_2$2B(2F,3F)—O2 | (1-2) | 18% |
| 3-HBOCF$_2$2B(2F,3F)—O4 | (1-2) | 6% |
| 4-HBOCF$_2$2B(2F,3F)—O2 | (1-2) | 8% |
| 5-HBOCF$_2$2B(2F,3F)—O2 | (1-2) | 18% |
| V—HHB-1 | (2-3) | 10% |
| V2-HHB-1 | (2-3) | 10% |

The composition had the following characteristics.

NI=69.9° C.; Tc<−20° C.; $\Delta$n=0.107; $\Delta\epsilon$=−3.7;

$\eta$=36.3 mPa·s; VHR-1=99.2%

Example 2

A liquid crystal composition having the following formulation was prepared.

| 3-BOCF$_2$2B(2F,3F)—O2 | (1-1) | 4% |
|---|---|---|
| 3-HBOCF$_2$2B(2F,3F)—O2 | (1-2) | 15% |
| 5-HBOCF$_2$2B(2F,3F)—O2 | (1-2) | 15% |
| 3-HH-4 | (2-1) | 10% |
| 3-HH-5 | (2-1) | 5% |
| 3-HHB-3 | (2-3) | 5% |
| 3-HHB(3F)—O2 | (3-2) | 5% |
| 5-HHB(3F)—O2 | (3-2) | 5% |
| 3-HH1OB(2F)—O2 | (3-5) | 5% |
| 5-HH1OB(2F)—O2 | (3-5) | 5% |
| 3-HHB(2F,3F)—O2 | (4-4) | 10% |
| 4-HHB(2F,3F)—O2 | (4-4) | 6% |
| 5-HHB(2F,3F)—O2 | (4-4) | 10% |

The composition had the following characteristics.

NI=82.0° C.; Tc<−30° C.; $\Delta$n=0.093; $\Delta\epsilon$=−3.3;

$\eta$=26.4 mPa·s; VHR-1=99.4%

Example 3

A liquid crystal composition having the following formulation was prepared.

| | | |
|---|---|---|
| 3-HBOCF$_2$B(2F,3F)—O2 | (1-2) | 11% |
| 5-HBOCF$_2$B(2F,3F)—O2 | (1-2) | 11% |
| 3-HH-4 | (2-1) | 10% |
| 3-HH-5 | (2-1) | 6% |
| 5-HH—V | (2-1) | 6% |
| 3-HHB-3 | (2-3) | 6% |
| 3-HB(3F)—O2 | (3-1) | 5% |
| 3-HHB(3F)—O2 | (3-2) | 5% |
| 3-HB(2F,3F)—O2 | (4-3) | 10% |
| 5-HB(2F,3F)—O2 | (4-3) | 10% |
| 3-HHB(2F,3F)—O2 | (4-4) | 11% |
| 5-HHB(2F,3F)—O2 | (4-4) | 11% |

The composition had the following characteristics.

NI=89.5° C.; Tc<−30° C.; Δn=0.087; Δϵ=−3.3;

η=22.9 mPa·s; VHR-1=99.3%

As compared to Comparative Example 2, the composition had an equivalent Δϵ, a high NI, a low viscosity, and a low Tc, and was superior in NI, viscosity and Tc to the comparative example.

Example 4

A liquid crystal composition having the following formulation was prepared.

| | | |
|---|---|---|
| 3-BOCF$_2$B(2F,3F)—O2 | (1-1) | 15% |
| 5-BOCF$_2$B(2F,3F)—O2 | (1-1) | 15% |
| 3-HBOCF$_2$B(2F,3F)—O2 | (1-2) | 15% |
| 5-HBOCF$_2$B(2F,3F)—O2 | (1-2) | 15% |
| 3-HH—V1 | (2-1) | 5% |
| 5-HH—V | (2-1) | 5% |
| 3-HHB—O1 | (2-3) | 4% |
| V—HHB—O1 | (2-3) | 8% |
| V2-HHB—O1 | (2-3) | 8% |
| 3-HHB(3F)—O2 | (3-2) | 10% |

The composition had the following characteristics.

NI=73.7° C.; Tc<−20° C.; Δn=0.091; Δϵ=−2.2;

η=25.5 mPa·s; VHR-1=99.3%

Example 5

A liquid crystal composition having the following formulation was prepared.

| | | |
|---|---|---|
| 3-BOCF$_2$B(2F,3F)—O2 | (1-1) | 10% |
| 5-BOCF$_2$B(2F,3F)—O2 | (1-1) | 10% |
| 3-HH-4 | (2-1) | 13% |
| 3-HH-5 | (2-1) | 6% |
| 3-HB—O2 | (2-2) | 8% |
| V—HHB-1 | (2-3) | 5% |
| V2-HHB-1 | (2-3) | 5% |
| 3-HB(3F)—O2 | (3-1) | 9% |
| 3-HHB(2F,3F)—O2 | (4-4) | 11% |
| 3-HHB(2F,3F)—O4 | (4-4) | 6% |
| 4-HHB(2F,3F)—O2 | (4-4) | 6% |
| 5-HHB(2F,3F)—O2 | (4-4) | 11% |

The composition had the following characteristics.

NI=81.6° C.; Tc<−20° C.; Δn=0.087; Δϵ=−3.2;

η=20.0 mPa·s; VHR-1=99.4%

As compared to Comparative Examples 1 and 2, the composition had an equivalent Δϵ, a high NI, an equivalent or low viscosity, and a low Tc, and was superior in NI, viscosity and Tc to the comparative examples.

Example 6

A liquid crystal composition having the following formulation was prepared.

| | | |
|---|---|---|
| 3-BOCF$_2$B(2F,3F)—O2 | (1-1) | 15% |
| 5-BOCF$_2$B(2F,3F)—O2 | (1-1) | 15% |
| 3-HBOCF$_2$B(2F,3F)—O2 | (1-2) | 10% |
| 5-HBOCF$_2$B(2F,3F)—O2 | (1-2) | 10% |
| 3-HH-4 | (2-1) | 5% |
| 3-HH—O1 | (2-1) | 5% |
| 3-HHB—O1 | (2-2) | 4% |
| 3-HHB—O2 | (2-2) | 4% |
| 3-HHB(3F)—O2 | (3-2) | 8% |
| 3-HHB(3F)—O4 | (3-2) | 4% |
| 5-HHB(3F)—O2 | (3-2) | 8% |
| 3-HH1OB(2F)—O2 | (3-5) | 5% |
| 5-HH1OB(2F)—O2 | (3-5) | 5% |

The composition had the following characteristics.

NI=80.4° C.; Tc<−30° C.; Δn=0.088; Δϵ=−2.0;

η=26.6 mPa·s; VHR-1=99.5%

Example 7

A liquid crystal composition having the following formulation was prepared.

| | | |
|---|---|---|
| 3-BOCF$_2$B(2F,3F)—O2 | (1-1) | 15% |
| 5-BOCF$_2$B(2F,3F)—O2 | (1-1) | 15% |
| 3-HBOCF$_2$B(2F,3F)—O2 | (1-2) | 15% |
| 5-HBOCF$_2$B(2F,3F)—O2 | (1-2) | 10% |
| 3-BBOCF$_2$B(2F,3F)—O2 | (1-3) | 5% |
| 3-BBOCF$_2$B(2F,3F)—O4 | (1-3) | 5% |
| 5-BBOCF$_2$B(2F,3F)—O2 | (1-3) | 5% |
| 5-BBOCF$_2$B(2F,3F)—O4 | (1-3) | 5% |
| 3-BOCF$_2$BB(2F,3F)—O2 | (1-4) | 5% |
| 3-HHB—O1 | (2-3) | 4% |
| 3-HHB—O2 | (2-3) | 6% |
| 3-HHB(3F)—O2 | (3-2) | 5% |
| 3-HBB(3F)—O2 | (3-3) | 5% |

The composition had the following characteristics.

NI=72.3° C.; Tc<−20° C.; Δn=0.125; Δϵ=−3.5;

η=39.7 mPa·s; VHR-1=99.1%

Example 8

A liquid crystal composition having the following formulation was prepared.

| | | |
|---|---|---|
| 3-BOCF$_2$B (2F,3F)-O2 | (1-1) | 10% |
| 5-BOCF$_2$B (2F,3F)-O2 | (1-1) | 10% |
| 3-HH-V | (2-1) | 10% |
| 3-HH-V1 | (2-1) | 10% |

-continued

| V-HHB-1         | (2-3) | 6%  |
| 3-HB (3F) -O2   | (3-1) | 10% |
| 5-HB (3F) -O2   | (3-1) | 10% |
| V-HHB (2F,3F) -O2 | (4-4) | 10% |
| 1V-HHB (2F,3F) -O2 | (4-4) | 8% |
| V2-HHB (2F,3F) -O2 | (4-4) | 8% |
| V2-HHB (2F,3F) -O3 | (4-4) | 8% |

The composition had the following characteristics.

NI=72.6° C.; Tc<−20° C.; Δn=0.089; Δε=−3.3;

η=18.3 mPa·s

As compared to Comparative Example 1, the composition had a high NI, a small Δε, a low viscosity, and Tc<−20° C., and was superior in NI, Δε, viscosity and Tc to the comparative example.

Example 9

A liquid crystal composition having the following formulation was prepared.

| 3-BOCF$_2$B (2F,3F) -O2 | (1-1) | 10% |
| 5-BOCF$_2$B (2F,3F) -O2 | (1-1) | 10% |
| 3-HH-4          | (2-1) | 10% |
| 3-HH-5          | (2-1) | 6%  |
| 3-HB (3F) -O2   | (3-1) | 10% |
| 5-HB (3F) -O2   | (3-1) | 10% |
| 3-HHB (3F) -O2  | (3-2) | 5%  |
| 5-HHB (3F) -O2  | (3-2) | 5%  |
| 3-HHB (2F,3F) -O2 | (4-4) | 10% |
| 3-HHB (2F,3F) -O4 | (4-4) | 8% |
| 5-HHB (2F,3F) -O2 | (4-4) | 10% |
| 3-HBB (2F,3F) -O2 | (4-5) | 6% |

The composition had the following characteristics.

NI=74.9° C.; Tc<−20° C.; Δn=0.093; Δε=−4.0;

η=26.1 mPa·s

Example 10

A liquid crystal composition having the following formulation was prepared.

| 3-BOCF$_2$B (2F,3F) -O2 | (1-1) | 10% |
| 3-BOCF$_2$B (2F,3F) -O4 | (1-1) | 5% |
| 5-BOCF$_2$B (2F,3F) -O2 | (1-1) | 5% |
| 3-HH-4          | (2-1) | 12% |
| 3-HH-5          | (2-1) | 6%  |
| 3-HB-O2         | (2-2) | 6%  |
| 7-HB-1          | (2-2) | 4%  |
| 3-HHB-3         | (2-3) | 5%  |
| 3-HB (3F) -O2   | (3-1) | 8%  |
| 3-HHB (3F) -O2  | (3-2) | 5%  |
| 3-BOCF$_2$B (2F,3F) -O2 | (4-2) | 8% |
| 4-BOCF$_2$B (2F,3F) -O2 | (4-2) | 5% |
| 5-BOCF$_2$B (2F,3F) -O2 | (4-2) | 8% |
| 3-HHB (2F,3F) -O2 | (4-4) | 7% |

The composition had the following characteristics.

NI=76.7° C.; Tc<−20° C.; Δn=0.087; Δε=−3.2;

η=21.2 mPa·s

Example 11

To the composition of Example 5, 100 ppm of 3,5-di-tert-butyl-4-hydroxytoluene was added as an antioxidant. The resulting composition had the following characteristics.

NI=81.6° C.; Tc<−20° C.; Δn=0.087; Δε=−3.2;

η=20.0 mPa·s; VHR-1=99.4%

Example 12

A liquid crystal composition having the following formulation was prepared.

| 3-BOCF$_2$B (2F,3F) -O2 | (1-1) | 10% |
| 3-BOCF$_2$B (2F,3F) -O2 | (1-1) | 10% |
| 3-HH-4          | (2-1) | 12% |
| V-HHB-1         | (2-3) | 5%  |
| V2-HHB-1        | (2-3) | 5%  |
| 3-HB (3F) -O2   | (3-1) | 5%  |
| 5-HB (3F) -O2   | (3-1) | 5%  |
| 3-HHB (2F,3F) -O2 | (4-4) | 11% |
| 5-HHB (2F,3F) -O2 | (4-4) | 6% |
| 3-BOCF$_2$B (2F,3F) -3 | — | 6% |
| 3-HEB-O2        | —     | 4%  |
| 5-HEB-O2        | —     | 4%  |
| 4-HHB (2F,3F) -1 | —    | 6%  |
| 5-HHB (2F,3F) -3 | —    | 11% |

The composition had the following characteristics.

NI=75.4° C.; Tc<−20° C.; Δn=0.089; Δε=−3.1;

η=21.3 mPa·s

INDUSTRIAL APPLICABILITY

The composition of the invention satisfies plural characteristic features selected from a wide temperature range of a nematic phase, a low viscosity, an appropriate optical anisotropy, a large negative dielectric anisotropy and a large specific resistance. The composition has the plural characteristic features in a well-balanced manner. The device of the invention contains the composition and has a large voltage holding ratio. The device contains the composition having such characteristics as a low viscosity, an optical anisotropy of from 0.050 to 0.130 and a dielectric anisotropy of from −6.5 to −2.0, whereby the AM device is suitable for a VA mode, an IPS mode and the like.

The invention claimed is:

1. A liquid crystal composition containing, as a first component, at least one compound selected from the group consisting of compounds represented by Formula (1-1); containing, as a second component, at least one compound selected from the group consisting of compounds represented by Formula (2-3); and having a negative dielectric anisotropy:

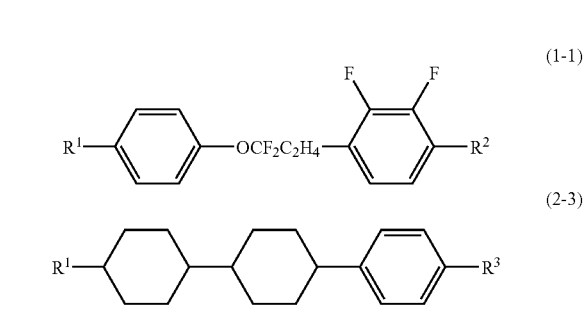

wherein R¹ represents an alkyl or an alkenyl; R² represents an alkoxy; and R³ represents an alkyl, an alkenyl or an alkoxy; and in these groups, each of the alkyl and the alkoxy has a carbon number of from 1 to 10, and the alkenyl has a carbon number of from 2 to 10.

2. The liquid crystal composition according to claim 1, wherein a content of the first component is from 10 to 95% by weight, and a content of the second component is from 5 to 90% by weight, based on the total weight of the liquid crystal composition.

3. A liquid crystal composition containing, as a first component, at least one compound selected from the group consisting of compounds represented by each of Formula (1-1) to Formula (1-4); containing, as a second component, at least one compound selected from the group consisting of compounds represented by each of Formula (2-1) to Formula (2-3); containing, as a third component, at least one compound selected from the group consisting of compounds represented by each of Formula (3-1) to Formula (3-5); and having a negative dielectric anisotropy:

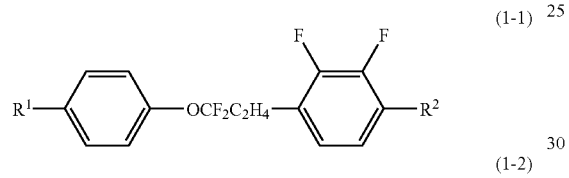

(1-1)

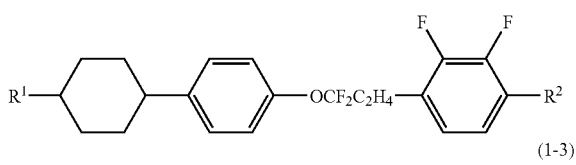

(1-2)

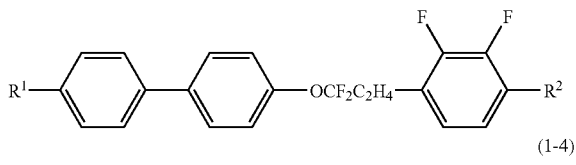

(1-3)

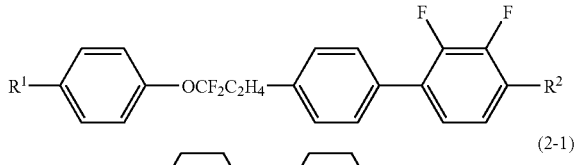

(1-4)

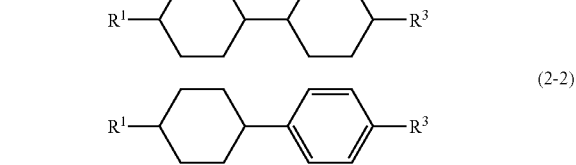

(2-1)

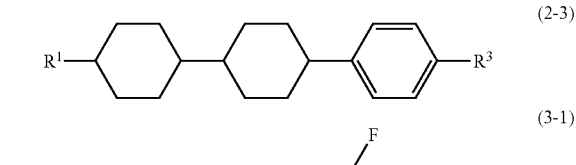

(2-2)

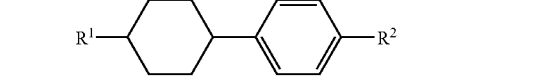

(2-3)

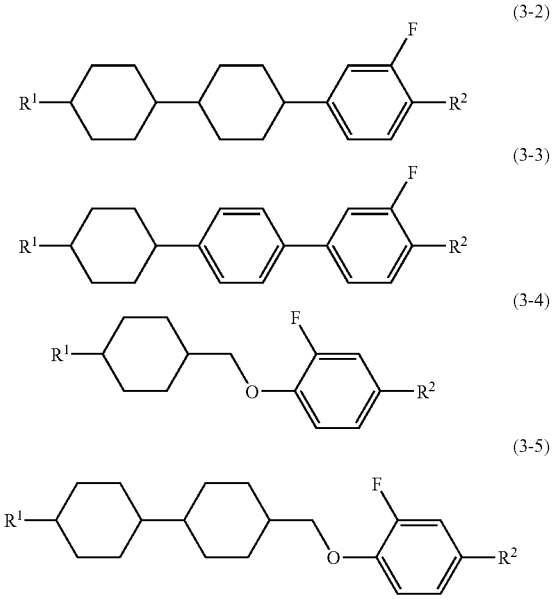

-continued (3-1) through (3-5)

wherein R¹ represents an alkyl or an alkenyl; R² represents an alkoxy; R³ represents an alkyl, an alkenyl or an alkoxy; and in these groups, each of the alkyl and the alkoxy has a carbon number of from 1 to 10, and the alkenyl has a carbon number of from 2 to 10.

4. The liquid crystal composition according to claim 3, wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), and contains, as the third component, at least one compound selected from the group consisting of compounds represented by each of Formula (3-1) to Formula (3-3).

5. The liquid crystal composition according to claim 3, wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), and contains, as the third component, at least one compound selected from the group consisting of compounds represented by each of Formula (3-4) and Formula (3-5).

6. The liquid crystal composition according to claim 3, wherein a content of the first component is from 10 to 90% by weight, a content of the second component is from 5 to 85% by weight, and a content of the third component is from 5 to 85% by weight, based on the total weight of the liquid crystal composition.

7. The liquid crystal composition according to claim 3, wherein a content of the first component is from 40 to 90% by weight, a content of the second component is from 5 to 55% by weight, and a content of the third component is from 5 to 55% by weight, based on the total weight of the liquid crystal composition.

8. A liquid crystal composition containing, as a first component, at least one compound selected from the group consisting of compounds represented by each of Formula (1-1) to Formula (1-4); containing, as a second component, at least one compound selected from the group consisting of compounds represented by each of Formula (2-1) to Formula (2-3); containing, as a third component, at least one compound selected from the group consisting of compounds represented by each of Formula (3-1) to Formula (3-5); containing, as a fourth component, at least one compound selected from the group consisting of compounds represented by each of Formula (4-1) to Formula (4-5); and having a negative dielectric anisotropy:

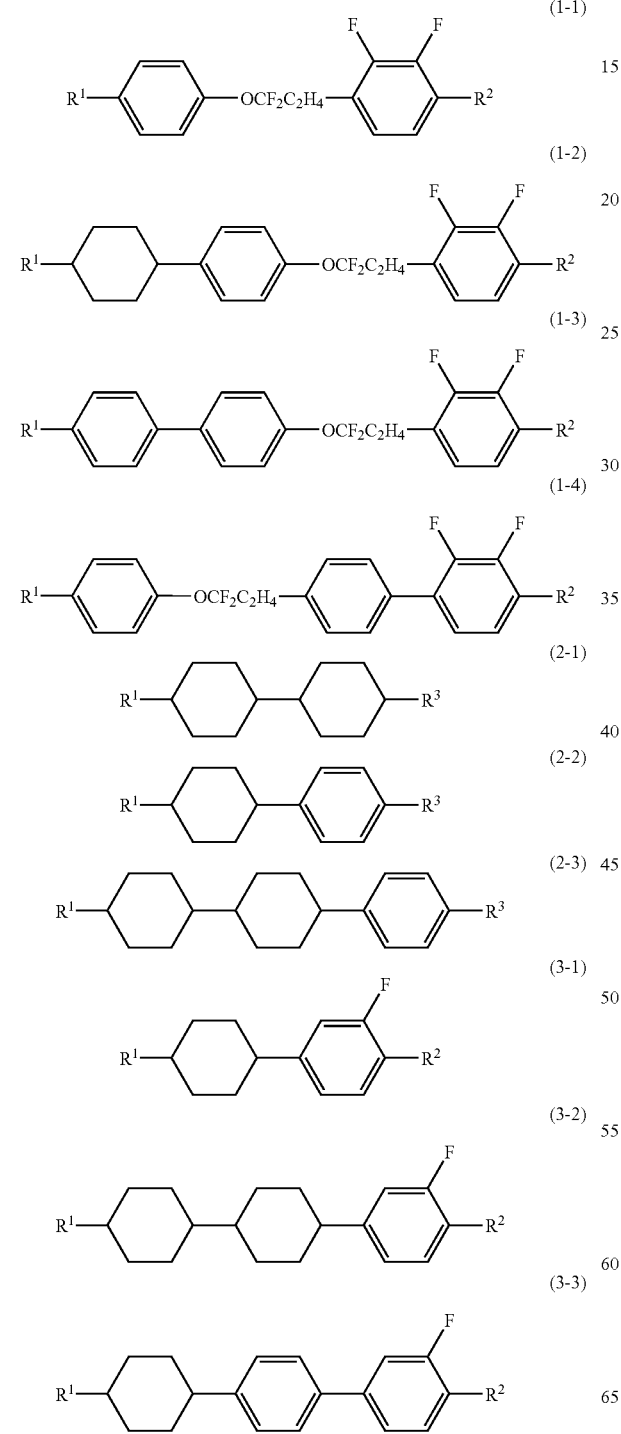

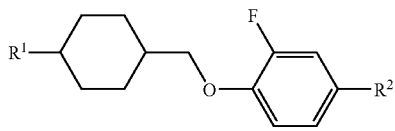

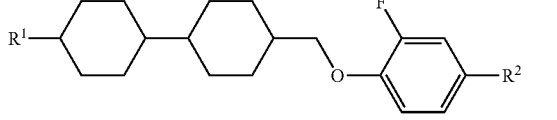

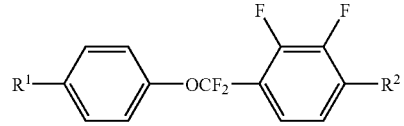

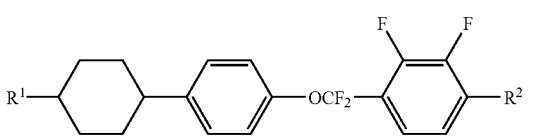

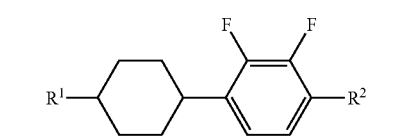

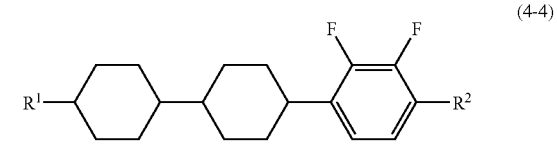

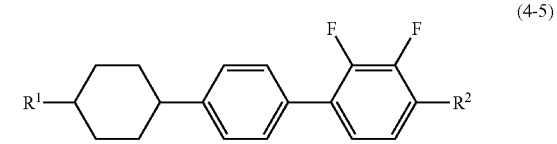

wherein $R^1$ represents an alkyl or an alkenyl; $R^2$ represents an alkoxy; $R^3$ represents an alkyl, an alkenyl or an alkoxy, and in these groups, each of the alkyl and the alkoxy has a carbon number of from 1 to 10, and the alkenyl has a carbon number of from 2 to 10.

9. The liquid crystal composition according to claim 8, wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-1) to Formula (4-5).

10. The liquid crystal composition according to claim 8, wherein the composition contains, as the first component, at least one compound selected from the group consisting of compounds represented by each of Formula (1-1) to Formula (1-4), contains, as the second component, at least-one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-1) and Formula (4-2).

11. The liquid crystal composition according to claim 8, wherein the composition contains, as the first component, at least one compound selected from the group consisting of compounds represented by each of Formula (1-1) to Formula (1-4), contains, as the second component, at least one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-3) to Formula (4-5).

12. The liquid crystal composition according to claim 8, wherein the composition contains, as the first component, at least one compound selected from the group consisting of compounds represented by Formula (1-1), contains, as the second component, at least one compound selected from the group consisting of compounds represented by each of Formula (2-1) to Formula (2-3), contains, as the third component, at least one compound selected from the group consisting of compounds represented by each of Formula (3-1) to Formula (3-3), and contains, as the fourth component, at least one compound selected from the group consisting of compounds represented by each of Formula (4-4) and Formula (4-5).

13. The liquid crystal composition according to claim 8, wherein the composition contains, as the first component, at least one compound selected from the group consisting of compounds represented by Formula (1-1), contains, as the second component, at least one compound selected from the group consisting of compounds represented by Formula (2-3), contains, as the third component, at least one compound selected from the group consisting of compounds represented by each of Formula (3-1) and Formula (3-2), and contains, as the fourth component, at least one compound selected from the group consisting of compounds represented by each of Formula (4-4) and Formula (4-5).

14. The liquid crystal composition according to claim 8, wherein a content of the first component is from 10 to 85% by weight, a content of the second component is from 5 to 80% by weight, a content of the third component is from 5 to 80% by weight, and a content of the fourth component is from 5 to 80% by weight, based on the total weight of the liquid crystal composition.

15. The liquid crystal composition according to claim 8, wherein a content of the first component is from 20 to 65% by weight, a content of the second component is from 10 to 55% by weight, a content of the third component is from 5 to 50% by weight, and a content of the fourth component is from 20 to 65% by weight, based on the total weight of the liquid crystal composition.

16. The liquid crystal composition according to claim 1, wherein the composition has a dielectric anisotropy in a range of from -6.5 to -2.0.

17. The liquid crystal composition according to claim 3, wherein the composition has a dielectric anisotropy in a range of from -6.5 to -2.0.

18. The liquid crystal composition according to claim 8, wherein the composition has a dielectric anisotropy in a range of from -6.5 to -2.0.

19. A liquid crystal display device containing the liquid crystal composition as described in claim 1.

20. The liquid crystal display device according to claim 19, wherein the device is an active matrix driving device having a VA mode or an IPS mode.

21. A liquid crystal display device containing the liquid crystal composition as described in claim 3.

22. The liquid crystal display device according to claim 21, wherein the device is an active matrix driving device having a VA mode or an IPS mode.

23. A liquid crystal display device containing the liquid crystal composition as described in claim 8.

24. The liquid crystal display device according to claim 23, wherein the device is an active matrix driving device having a VA mode or an IPS mode.

* * * * *